US009702987B2

(12) United States Patent
Kono et al.

(10) Patent No.: US 9,702,987 B2
(45) Date of Patent: Jul. 11, 2017

(54) NEUTRON MEASUREMENT APPARATUS, NEUTRON CALCULATION APPARATUS, AND NEUTRON MEASUREMENT METHOD

(71) Applicant: Kabushiki Kaisha Toshiba, Minato-ku (JP)

(72) Inventors: Shigehiro Kono, Tama (JP); Daijiro Ito, Kodaira (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/209,112

(22) Filed: Jul. 13, 2016

(65) Prior Publication Data

US 2017/0017002 A1 Jan. 19, 2017

(30) Foreign Application Priority Data

Jul. 16, 2015 (JP) ................................ 2015-142458
Dec. 11, 2015 (JP) ................................ 2015-242549

(51) Int. Cl.
*G01T 3/00* (2006.01)

(52) U.S. Cl.
CPC .................................. *G01T 3/006* (2013.01)

(58) Field of Classification Search
CPC ..................................................... G01T 3/006
See application file for complete search history.

(56) References Cited

U.S. PATENT DOCUMENTS 4,475,038 A * 10/1984 Lochmann ............. G01V 5/101 250/269.6
5,068,532 A * 11/1991 Wormald ............... G01V 5/104 250/265
5,225,149 A * 7/1993 Banda .................. G21C 17/112 376/254
5,591,967 A * 1/1997 Moake .................. G01V 5/104 250/252.1

(Continued)

FOREIGN PATENT DOCUMENTS

| | | |
|---|---|---|
| JP | 59-21112 | 2/1984 |
| JP | 3-77474 | 12/1991 |
| JP | 2013-181766 | 9/2013 |

OTHER PUBLICATIONS

Glenn F. Knoll "Radiation Detection and Measurement", Third Edition, Joh Wile & Sons, Inc., 9 pages.

*Primary Examiner* — Marcus Taningco
(74) *Attorney, Agent, or Firm* — Oblon, McClelland, Maier & Neustadt, L.L.P.

(57) ABSTRACT

According to an embodiment, a neutron measurement apparatus has: a neutron detector; a gamma ray detector; a neutron detector signal processing unit which performs Fourier transform on the signals received for a prescribed period, generates neutron detector signal frequency data in a frequency domain, calculates the neutron-detection signal power spectrum and stores it; a gamma-ray detector signal processing unit which performs Fourier transform on the signals received for a prescribed period, generates gamma ray detector signal frequency data in a frequency domain, (Continued)

calculates gamma ray detector signal power spectrum and stores it; and a neutron calculation unit which generates a neutron signal by removing a part contributed by the gamma ray detector signal power spectrum from the neutron detector signal power spectrum.

8 Claims, 24 Drawing Sheets

(56) References Cited

U.S. PATENT DOCUMENTS

| | | | | |
|---|---|---|---|---|
| 5,659,177 | A * | 8/1997 | Schulte | G01T 3/08 250/370.05 |
| 8,878,139 | B2 | 11/2014 | Kono et al. | |
| 2011/0068275 | A1* | 3/2011 | McCormick | G01T 1/185 250/391 |
| 2012/0126106 | A1* | 5/2012 | Zhou | G01V 5/104 250/269.6 |
| 2012/0145913 | A1* | 6/2012 | Feller | G01T 3/001 250/390.11 |
| 2013/0240743 | A1* | 9/2013 | Nelson | G01T 3/001 250/370.05 |
| 2015/0006115 | A1* | 1/2015 | Svoboda | G01D 3/08 702/190 |
| 2015/0348655 | A1 | 12/2015 | Kono et al. | |
| 2015/0348656 | A1 | 12/2015 | Kono et al. | |
| 2016/0131775 | A1 | 5/2016 | Kono et al. | |
| 2016/0180977 | A1 | 6/2016 | Ito et al. | |

* cited by examiner

NEUTRON MEASUREMENT APPARATUS, NEUTRON CALCULATION APPARATUS, AND NEUTRON MEASUREMENT METHOD

CROSS-REFERENCE TO RELATED APPLICATIONS

This application is based upon and claims the benefit of priority from Japanese Patent Application No. 2015-142458 filed on Jul. 16, 2015, and Japanese Patent Application No. 2015-242549 filed on Dec. 11, 2015, the entire contents of which are incorporated herein by reference.

FIELD

The embodiments of this invention relate to a neutron measurement apparatus, a neutron calculation apparatus, and a neutron measurement method using those.

BACKGROUND

In a boiling-water reactor (BWR), the intermediate range monitor performs the Campbell method to measure the signals output from the fission ionization chamber.

On the other hand, in a pressurized-water reactor (PWR), the intermediate range monitor has a gamma-ray compensated detector configured to detect the net current signal output from the proportional counters exposed to neutron.

A gamma-ray compensated neutron detecting apparatus is known. Like the gamma-ray compensated detector used in the PWR, this neutron detecting device has a neutron sensor sensitive to neutrons and gamma rays and a gamma-ray compensated unit sensitive to gamma rays only. In the neutron detecting apparatus, the signals output from the gamma-ray compensated unit in a time domain are used, correcting the output signals of the neutron sensor, thereby measuring the net value of each neutron signal.

To measure neutrons by using the current signals output from the gamma-ray compensated neutron detecting device, the difference between the output current of the neutron sensor sensitive to neutrons and the output current of the gamma-ray compensated unit is determined, thereby detecting the net value of the current generated by the neutron.

To measure neutrons by using the pulse signals output from the gamma-ray compensated neutron detecting device, the pulses output from the neutron sensor are counted and the pulses output from the gamma-ray compensated unit are also counted. The difference between the number of the output pulses of the neutron sensor and the number of output pulses of the gamma-ray compensated unit is determined, thereby detecting the net value of neutron signal. Alternatively, the output signal of the neutron sensor may be intercepted (i.e. gated) by the output signal of the gamma-ray compensated unit, thereby to count the signals generated only from the neutrons.

In order to measure the signal output from the gamma-ray compensated neutron detecting device using the differential current, or in order to count only the signals resulting from neutrons by gating the pulses output from the neutron sensor with the signals output from the gamma-ray compensated unit, it is necessary to ensure the coincidence between the output signals of the neutron sensor and the output signals of the gamma-ray compensated unit.

In the process of measuring the differential current, the current generated from gamma rays in the neutron sensor is cancelled out by the current generated from gamma rays in the gamma-ray compensated unit. Therefore, the neutron sensor and the gamma-ray compensated unit must respond in the same way to gamma rays. More precisely, the neutron sensor and the gamma-ray compensated unit must have same performance regarding a detector power supply and a detection signal amplifier.

In order to measure the signal output of the neutron detection apparatus from the difference between the number of pulses output from the neutron sensor and the number of pulses output from the gamma-ray compensated unit, the above-mentioned coincidence is not so strictly required. However, the neutron sensor and the gamma-ray compensated unit must have the same sensitivity to gamma rays. The circuits for measuring the signals output from the neutron detection apparatus should therefore have the same characteristics.

DETAILED DESCRIPTION

Figure 1:
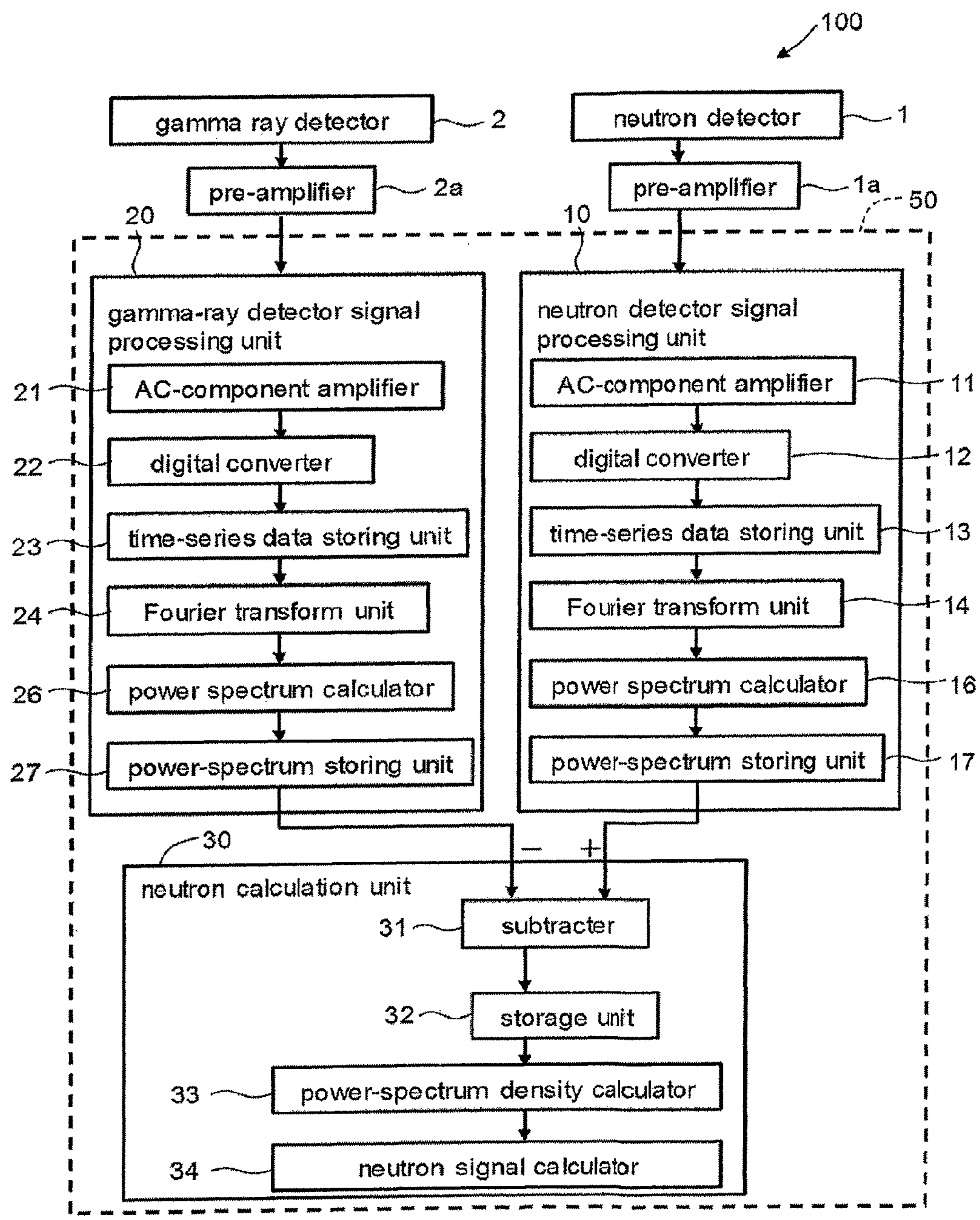
FIG. 1 is a block diagram showing the configuration of a neutron measurement apparatus according to a first embodiment.

In order to ensure the synchronism of signals, the neutron sensor and the gamma-ray compensated unit must be arranged at the same position. The neutron sensor and the gamma-ray compensated unit are therefore combined, forming an integral unit. Further, voltages of the opposite polarities are applied to each of the excitation electrode and the compensation electrode that oppose respectively the signal electrode common to the neutron sensor and the gamma-ray compensated unit. As a result, the ionized electrons behave in one direction in the neutron sensor, and in the opposite direction in the gamma-ray compensated unit. Consequently, the ionized electrons influence the self-shielding in one of the neutron sensor and the gamma-ray compensated unit, much more than in the other unit.

Embodiments have been made in order to solve the problem specified above. The object of the embodiments of the present invention is to measure neutrons not only by a neutron sensor, but also by a gamma-ray compensated unit, without the necessity of synchronizing the output signal of the neutron sensor with the output signal of the gamma-ray compensated unit.

According to an embodiment, there is provided a neutron measurement apparatus comprising: a neutron detector configured to measure neutrons; a gamma ray detector configured to measure gamma rays; a neutron detector signal processing unit configured to receive signals from the neutron detector sequentially, to perform Fourier transform on the signals received for a prescribed period, to generate neutron detector signal frequency data in a frequency domain, thereby to calculate the neutron-detection signal power spectrum and to store the neutron detector signal power spectrum; a gamma-ray detector signal processing unit configured to receive signals from the gamma ray detector sequentially, to perform Fourier transform on the signals received for a prescribed period, to generate gamma ray detector signal frequency data in a frequency domain, thereby to calculate gamma ray detector signal power spectrum and to store the gamma ray detector signal power spectrum; and a neutron calculation unit configured to generate a neutron signal by removing a part contributed by the gamma-ray-detector signal power spectrum from the neutron detector signal power spectrum.

According to another embodiment, there is provided a neutron calculation apparatus comprising: a neutron detector signal processing unit configured to receive signals sequentially from a neutron detector for measuring neutrons, to perform Fourier transform on the signals received for a prescribed period, to generate neutron detector signal frequency data in a frequency domain, thereby to calculate a neutron-detection signal power spectrum and to store the neutron detector signal power spectrum; a gamma-ray detector signal processing unit configured to receive signals from the gamma ray detector sequentially, to perform Fourier transform on the signals received for a prescribed period, thereby to provide frequency data about gamma-ray detector signals in a frequency region and generate and store a gamma-ray-detector signal power spectrum; and a neutron calculation unit configured to generate a neutron signal by removing a part contributed by the gamma-ray-detector signal power spectrum, from the neutron detector signal frequency data.

According to another embodiment, there is provided a neutron measurement method comprising: a neutron detector signal processing step in which a neutron detector signal processing unit receives signals from a neutron detector sequentially, performs Fourier transform on the signals received for a prescribed period, generates neutron detector signal frequency data in a frequency domain, thereby calculates the neutron-detection signal power spectrum and stores the neutron detector signal power spectrum; a gamma-ray detector signal processing step in which a gamma-ray detector signal processing unit receives signals from the gamma ray detector sequentially, performs Fourier transform on the signals received for a prescribed period, generates the gamma-ray-detector signal frequency data in the frequency domain, thereby calculates gamma-ray-detector signal power spectrum and stores the gamma-ray-detector signal power spectrum; and a neutron signal generating step in which a neutron calculation unit generates a neutron signal by removing a part contributed by the gamma-ray-detector signal power spectrum from the neutron detector signal power spectrum.

Neutron measurement apparatuses, neutron calculation apparatuses, and neutron measurement methods according to the embodiments will be described with reference to the accompanying drawing. The components of any embodiment, which are identical or similar to those of the other embodiments, are designated by the same reference numbers in the drawing and will not be described repeatedly.

First Embodiment

FIG. 1 is a block diagram showing the configuration of a neutron measurement apparatus according to first embodiment. The neutron measurement apparatus 100 has a gamma-ray compensated neutron detecting device and a neutron calculation apparatus 50.

The gamma-ray compensated neutron detecting device includes a neutron detector 1, a pre-amplifier 1*a*, a gamma ray detector 2, and a pre-amplifier 2*a*. The neutron detector 1 is used as neutron sensing unit. The pre-amplifier 1*a* amplifies the output of the neutron detector 1. The gamma ray detector 2 is used as gamma-ray compensating unit. The pre-amplifier 2*a* amplifies the output of the gamma ray detector 2.

The neutron detector 1 detects neutrons. The detector that has good responsiveness such as a fission ionization chamber is desired to be used as the neutron detector 1. A detector of any other type, such as a semiconductor detector, can be used alternately if it has responsiveness as good as that of the fission ionization chamber. An ionization chamber, which has the same shape as the fission ionization chamber and has electrodes uncoated with fissionable substance, can be used as the gamma ray detector 2. Still another type of detector, such as a semiconductor detector, can be used alternately if it has responsiveness as good as that of the ionization chamber.

The gamma ray detector 2, based on the same operating principle as the neutron detector 1, is desirable to be used. If the gamma ray detector 2 is an ionization chamber, it is desirable to have the same shape as the neutron detector 1 and have an electrode not coated with fissionable substance.

The neutron detector 1 and the gamma ray detector 2 are independent of each other in terms of structure. They should better be located at the same position. Alternatively, the neutron detector 1 and the gamma ray detector 2 may be located at different positions around the reactor at which the neutrons and the gamma rays measured have a common frequency spectrum. Such positions are for example symmetric positions with respect to the reactor.

The neutron detector 1 and the pre-amplifier 1*a* are used in unison. The pre-amplifier 1*a* amplifies the feeble output of the neutron detector 1. Hereinafter, even the output of the pre-amplifier 1*a* will be referred to as output signal of the neutron detector 1. Similarly, the gamma ray detector 2 and the pre-amplifier 2*a* are used in unison. The pre-amplifier 2*a* amplifies the feeble output of the gamma ray detector 2. Hereinafter, even the output of the pre-amplifier 2*a* will be referred to as output signal of the gamma ray detector 2.

The neutron calculation apparatus 50 is a computer system comprising a central processing unit (CPU), a storage unit, and an input/output unit. The central processing unit has an arithmetic unit, a control unit, and registers. If necessary, some elements, such as alternative current component (AC-component) amplifier, described later, may be used in addition to the computer system. As will be described in detail, the neutron calculation apparatus 50 has a neutron detector signal processing unit 10, a gamma-ray detector signal processing unit 20, and a neutron calculation unit 30. Each of these may use a common computer or may use respective computer.

The neutron detector signal processing unit 10 receives a time domain signal from the pre-amplifier 1*a* connected to the output side of the neutron detector 1, and generates neutron detector signal frequency data in a frequency domain. The neutron detector signal processing unit 10 then calculates and stores the neutron detector signal power spectrum. The gamma-ray detector signal processing unit 20 receives a time domain signal from the pre-amplifier 2*a* connected to the output side of the gamma ray detector 2, and generates gamma-ray-detector signal frequency data in the frequency domain. The gamma-ray detector signal processing unit 20 then calculates and stores the gamma-ray detector signal power spectrum. The neutron calculation unit 30 performs an operation and calculates a neutron signal, based on the neutron detector signal power spectrum and the gamma-ray detector signal power spectrum. Each of these will be described in detail.

The neutron detector signal processing unit 10 has an AC-component amplifier 11, a digital converter 12, a time-series data storing unit 13, a Fourier transform unit 14, a power spectrum calculator 16, and a power-spectrum storing unit 17.

The AC-component amplifier 11 of the neutron detector signal processing unit 10 extracts an AC component from the output signal of the neutron detector 1 and amplifies the AC component.

The digital converter 12 filters the AC component amplified by the AC-component amplifier 11. The digital converter 12 then samples the AC component and converts the AC component into a time-series digital data. The time-series data storing unit 13 stores the time-series digital data generated in the digital converter 12.

The Fourier transform unit 14 continuously acquires the time-series digital data continuously stored in the time-series data storing unit 13, for a prescribed period of time $\Delta\tau$ at time intervals $\Delta T$. Then, the Fourier transform unit 14 performs Fourier transform on the time-series data so acquired. The time needed to calculate the Fourier transform on the time-series data of the prescribed period of time $\Delta\tau$ is somewhat shorter than the time interval $\Delta T$. Since new time-series data is acquired at time intervals $\Delta T$, neutrons can be continuously measured.

The Fourier transform unit 14 outputs the neutron detector signal frequency data generated by the Fourier transform. The power spectrum calculator 16 calculates a power spectrum (real number) from the neutron detector signal frequency data (complex number) for each frequency. The neutron detector signal power spectrum is, for example, the intensity spectrum for frequency f, i.e., intensity distribution data about frequency f. Frequency f may be replaced by angular frequency $\omega$ ($\omega=2\pi f$). The power-spectrum storing unit 17 stores the neutron detector signal power spectrum.

The gamma-ray detector signal processing unit 20 is structured similarly to the neutron detector signal processing unit 10. That is, the gamma-ray detector signal processing unit 20 has an AC-component amplifier 21, a digital converter 22, a time-series data storing unit 23, a Fourier transform unit 24, a power spectrum calculator 26, and a power-spectrum storing unit 27.

The AC-component amplifier 21 of the gamma-ray detector signal processing unit 20 extracts the AC component from the output signal of the gamma ray detector 2 and amplifies the AC component.

The digital converter 22 filters the AC component amplified by the AC-component amplifier 21. The digital converter 22 then samples the AC component and converts the AC component into a time-series digital signal. The time-series data storing unit 23 stores the time-series digital data generated in the digital converter 22.

The Fourier transform unit 24 acquires the time-series data at prescribed period of time from the time-series digital data stored in the time-series data storing unit 23, and performs Fourier transform on the time-series data, and thereby generates gamma-ray-detector signal frequency data. The power spectrum calculator 26 calculates a power spectrum (real number) from the gamma-ray-detector signal frequency data (complex number) for each frequency. The power-spectrum storing unit 27 stores the gamma-ray-detector signal power spectrum.

Each of the following units has almost the same characteristics as possible as can be, for example the same specification each other.

The units are the AC-component amplifier 21 of the gamma-ray detector signal processing unit 20, the AC-component amplifier 11 of the neutron detector signal processing unit 10, the digital converter 22 of the gamma-ray detector signal processing unit 20, the digital converter 12 of the neutron detector signal processing unit 10, the Fourier transform units 24 of the gamma-ray detector signal processing unit 20, the Fourier transform unit 14 of the neutron detector signal processing unit 10, the power spectrum calculator 26 of the gamma-ray detector signal processing unit 20, and the power spectrum calculator 16 of the neutron detector signal processing unit 10.

Hence, the corresponding units each other have almost the same noise characteristic.

The time-series data storing unit 23 of the gamma-ray detector signal processing unit 20 corresponds to the time-series data storing unit 13 of the neutron detector signal processing unit 10. The power-spectrum storing unit 27 of the gamma-ray detector signal processing unit 20 corresponds to the power-spectrum storing unit 17 of the neutron detector signal processing unit 10. The time-series data storing unit 23 and the time-series data storing unit 13 should better be identical hard components, for example both are random access memories (SRAMs) or dynamic random access memories (DRAMs). Similarly, the power-spectrum storing unit 27 and the power-spectrum storing unit 17 should better be identical hard components, for example both are SRAMs or DRAMs.

The neutron calculation unit 30 includes a subtracter 31, a storage unit 32, a power-spectrum density calculator 33, and a neutron signal calculator 34.

The subtracter 31 receives the neutron detector signal power spectrum stored in the power-spectrum storing unit 17 of the neutron detector signal processing unit 10 and the gamma-ray-detector signal power spectrum stored in the power-spectrum storing unit 27 of the gamma-ray detector signal processing unit 20. The subtracter 31 outputs the value obtained by subtracting the gamma-ray-detector signal power spectrum from the neutron detector signal power spectrum. That is, the subtracter 31 subtracts a component attributed to the gamma rays detected by the neutron detector 1, from the neutron detector signal power spectrum. Not having the component attributed to the gamma rays, the output of the subtracter 31 represents the contribution of neutrons in the frequency domain.

Figure 2:
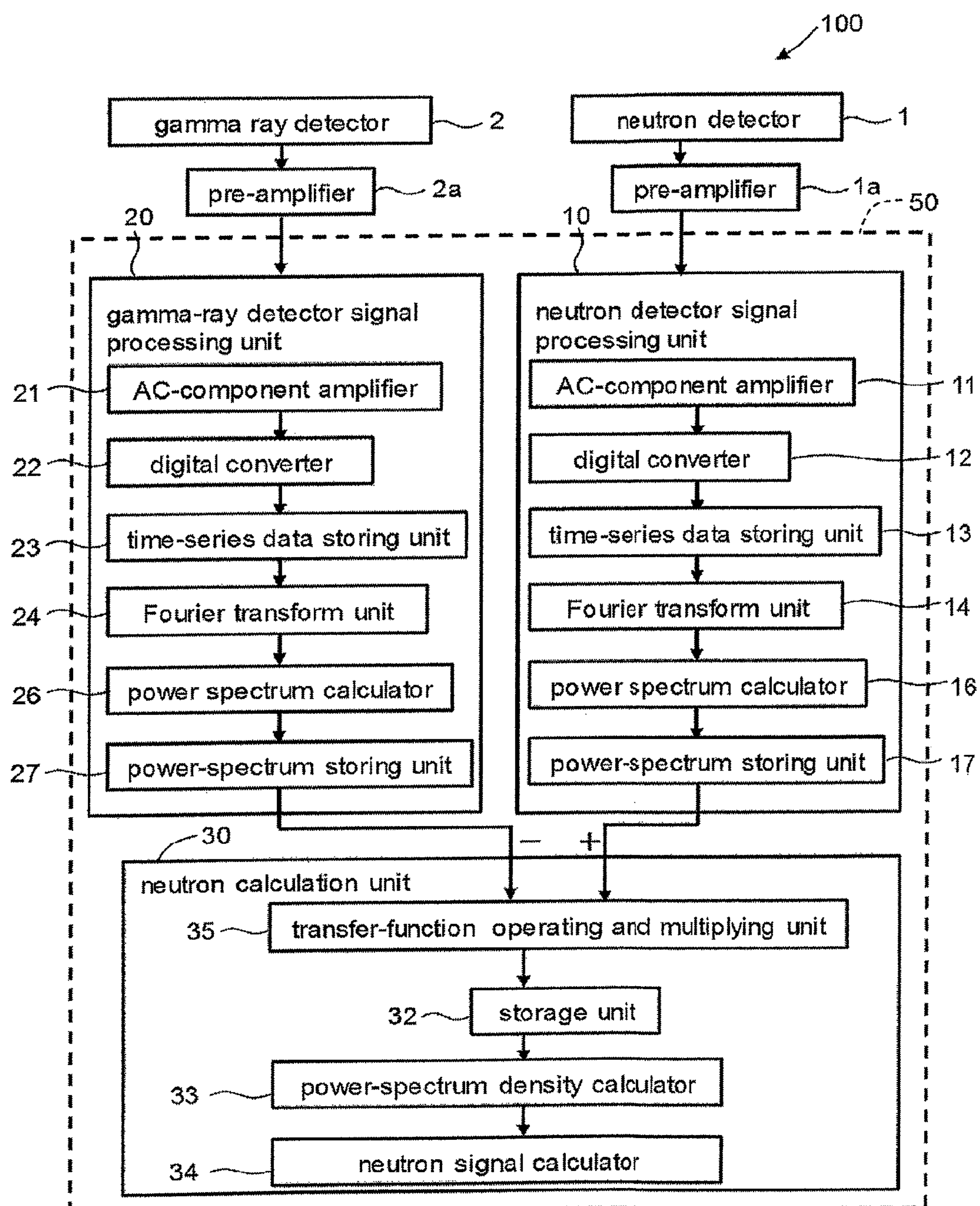
FIG. 2 is a block diagram showing a modified configuration of the power spectrum calculator of the neutron measurement apparatus according to the first embodiment.

FIG. 2 is a block diagram showing a modified configuration of the power spectrum calculator of the neutron measurement apparatus according to the first embodiment. As shown in FIG. 2, a transfer-function operating and multiplying unit 35 may replace the subtracter 31 in the neutron calculation unit 30. The transfer-function operating and multiplying unit 35 calculates the transfer function, i.e., G(f)=1−(gamma-ray-detector signal power spectrum)/(neutron detector signal power spectrum). The transfer-function operating and multiplying unit 35 multiplies the transfer function by the neutron detector signal power spectrum to obtain G(f)×(neutron detector signal power spectrum) for each frequency.

The storage unit 32 of the neutron calculation unit 30 stores the neutron-contributed data calculated by the subtracter 31. Alternatively, in the modified case, the storage unit 32 of the neutron calculation unit 30 stores the numerical data obtained by multiplying the neutron detector signal power spectrum obtained in the transfer-function operating and multiplying unit 35 by the transfer-function.

The power-spectrum density calculator 33 calculates power spectrum density from the neutron-contributed data stored in the storage unit 32. In the case of the modified apparatus, the power-spectrum density calculator 33 calculates power spectrum density from the numerical data obtained by multiplying the neutron detector signal power spectrum with transfer-function calculated by the transfer-function operating and multiplying unit 35. The neutron-contributed data or the numerical data obtained by multiplying the transfer function by the neutron detector signal power spectrum calculated in the transfer-function operating and multiplying unit 35 is data of the frequency domain. As shown in the following equation (1), the power spectrum density (PSD) is the mean square value of the numerical data×(k) in the frequency domain, that is, the value obtained by dividing the sum of square value of the numerical data×(k) by data number N. The numerical data×(k) is the neutron-contributed data or the data obtained by multiplying the neutron detector signal power spectrum with transfer function. The data number N is the number of data for Discrete Fourier Transform.

$$\mathrm{PSD}=\Sigma_{n=1}^{N}|X(n)|^2/N \tag{1}$$

The neutron signal calculator 34 multiplies the power spectrum density PSD calculated in the power-spectrum density calculator 33, by conversion factor kn, to generate a neutron signal Vn.

The conversion factor kn can be determined by using a known neutron source, detecting the neutrons by the neutron detector 1, processing signals by the neutron detector signal processing unit 10, and calculating the power spectrum density PSD in the neutron calculation unit 30. That is, the conversion factor kn is calculated by dividing the neutron intensity at the place of the neutron detector 1 by the power spectrum density PSD.

Unless high precision is required, the neutron source is not used. In this case, the neutron intensity and the level of the signal input to the neutron detector signal processing unit 10 are calculated, and a simulated signal may be input to the neutron detector signal processing unit 10.

Figure 3:
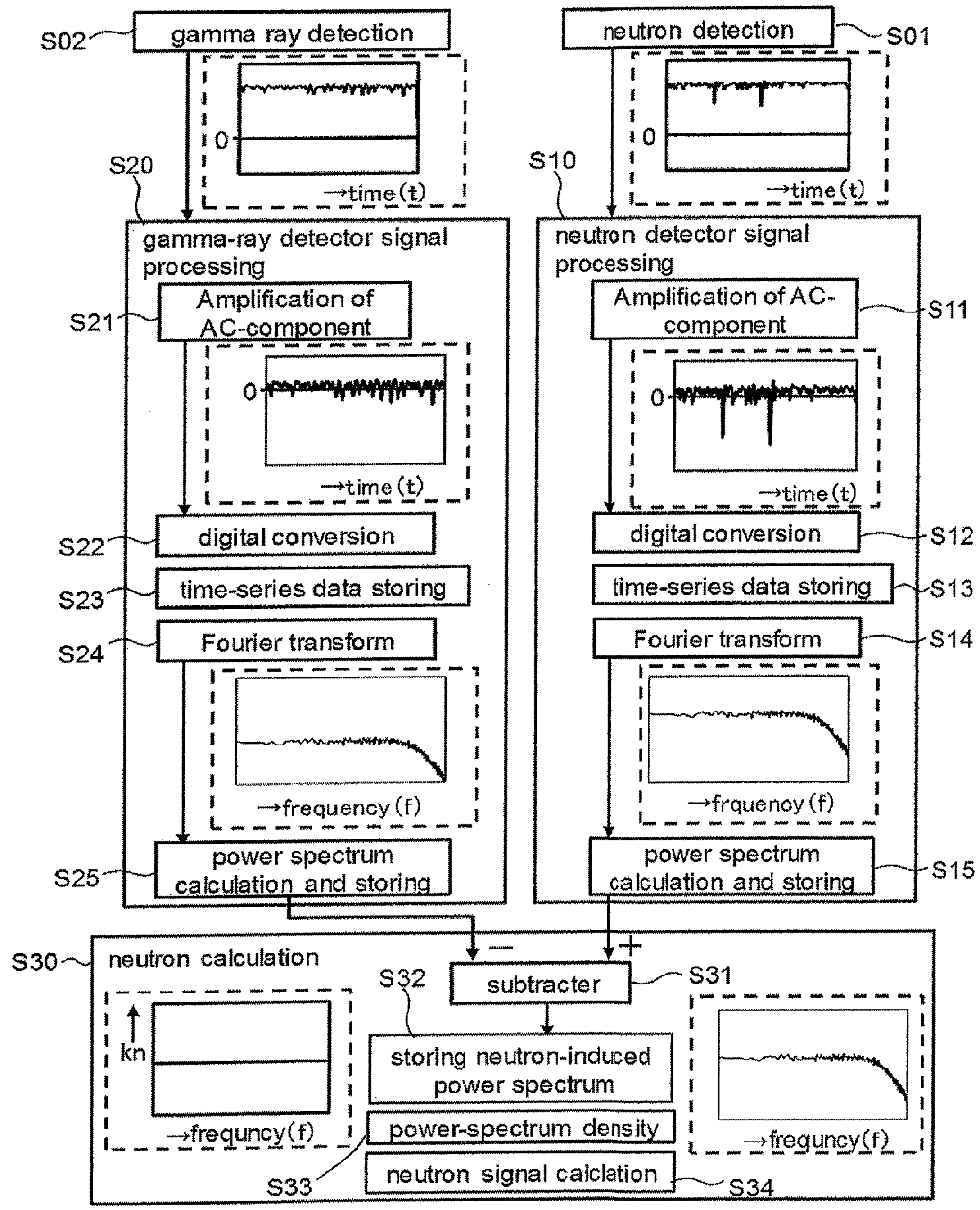
FIG. 3 is a flowchart showing a procedure of a neutron measurement method according to the first embodiment.

FIG. 3 is a flowchart showing a procedure of a neutron measurement method according to the first embodiment.

The neutron detector 1 detects neutrons (Step S01). Since the neutron detector 1 is sensitive also to gamma rays, the output signal of the neutron detector 1 has a gamma-ray contributed part. If the neutron flux has a relatively high level, the time interval of neutron incident to the neutron detector 1 is relatively short, and the pulse signals resulting from the incident neutrons overlap one another. As a result, the output of the neutron detector 1 increases and decreases around a level higher than 0 level, as shown in that part of Step S01 in FIG. 3.

The gamma ray detector 2 detects gamma rays (Step S02). If the gamma-ray level is relatively high, the output of the gamma ray detector 2 increases and decreases around a level higher than 0 level, like the output of the neutron detector 1, as shown in that part of Step S02 in FIG. 3.

Step S10 of processing neutron detector signals will be explained. First, the AC-component amplifier 11 extracts and amplifies the AC component of the signal output from the neutron detector 1 (Step S11). The signal output from the neutron detector 1 is a signal that increases and decreases around a level higher than 0 level as described above. The AC-component amplifier 11 subtracts the DC component from the signal to converts the signal into an AC component, a signal changing around a value above or below 0 level. Then, the AC-component amplifier 11 amplifies the AC component.

The AC component amplified in Step 11 is converted into a digital signal by the digital converter 12 (Step S12). The digitalized signal of the AC component is stored in the time-series data storing unit 13 (Step S13).

A prescribed part of the time-series data stored in the time-series data storing unit 13, i.e., digital AC component data, is performed Fourier transform by the Fourier transform unit 14. (Step S14). The "prescribed part" of the time-series data is, for example, data pertaining to a prescribed part of the time-series data. Thus, the time-series data of the AC component resulting from the output signal of the neutron detector 1 is converted into the frequency data of the neutron detector signal in the frequency domain.

The signal output from the neutron detector 1 contains signal resulting from the neutrons, signal resulting from the gamma rays, and noises. Therefore, the neutron detector signal frequency data is the sum of the frequency data about the neutrons, the frequency data about the gamma rays, and the frequency data about the noise.

The neutron detector signal frequency data (complex number) resulting from the output signal of the neutron detector 1, which has been converted in Step S14, is converted by the power spectrum calculator 16 into the neutron detector signal power spectrum (real number) for each frequency. The power spectrum is stored in the power-spectrum storing unit 17 (Step S15).

Step S20 of processing the gamma-ray detector signal will be explained. First, the AC-component amplifier 21 extracts and amplifies the AC component of the signal output from the gamma ray detector 2 (Step S21). As specified above, the signal output from the gamma ray detector 2 increases and decreases around a level higher than 0 level. The AC-component amplifier 21 subtracts the DC component from the signal and converts the signal into an AC component changing at a level lower or higher than 0 level. Then, the AC-component amplifier 21 amplifies the AC component.

The AC component amplified by the AC-component amplifier 21 is converted into digital data by the digital converter 22 (Step S22). The digitalized AC component is stored in the time-series data storing unit 23 (Step S23).

A prescribed part of the time-series data of the AC component stored in the time-series data storing unit 23 at Step S23 is performed Fourier transform in the Fourier transform unit 24 (Step S24). The "prescribed part" means the same part as the time-series data which is caused by the neutron detector 1 and is performed Fourier transform in Step S14.

Thus, the time-series data of the AC component resulting from the output signal of the gamma ray detector 2 is converted into the gamma-ray-detector signal frequency data in the frequency domain.

The signal output from the gamma ray detector 2 contains both of noise and the signal resulting from the gamma rays. The gamma-ray-detector signal frequency data is therefore the sum of the frequency data about the gamma rays and the frequency data about the noise.

The frequency component of any signal output from the gamma ray detector 2 basically depends on the response characteristic of the gamma ray detector 2 to the gamma rays. The frequency component therefore scarcely changes with time. Hence, even if the timing data is lost in the Fourier transform, the gamma-ray-detector signal frequency data can be regarded as constant. Further, if the neutron detector 1 and the gamma ray detector 2 have the same shape, that component of the neutron detector signal frequency data, which results from the gamma rays, can be considered identical to the gamma-ray-detector signal frequency data in practice.

In processing in each component of the gamma-ray detector signal processing unit 20, a noise component is added. The noise component is converted into a component falling in the frequency domain, and therefore has no time restriction. That is, the noise component therefore has frequency characteristic only. Since each component of the gamma-ray detector signal processing unit 20 is identical in characteristic to its counterpart of the neutron detector signal processing unit 10, the noise added in it has a frequency characteristic similar to the noise added in its counterpart of the neutron detector signal processing unit 10. Therefore, the frequency data resulting from the noise in the gamma-ray detector signal processing unit 20is almost identical to that in the signal processing unit 10.

The gamma-ray-detector signal frequency data (complex number) resulting from the output signal of the gamma ray detector 2, which has been transformed in Step S24, is converted into the gamma-ray-detector signal power spectrum (real number) in the power spectrum calculator 26. The power spectrum is stored in the power-spectrum storing unit 27 (Step S25).

The sequence of Step 30, i.e., neutron calculating step, will be explained. First, the subtracter 31 receives the neutron-detection signal power spectrum stored in the power-spectrum storing unit 17 at Step S15 and the gamma-ray-detector signal power spectrum stored in the power-spectrum storing unit 27 at Step S25.

The subtracter 31 subtracts the gamma-ray-detector signal power spectrum from the neutron detector signal power spectrum (Step S31). The power spectrum pertaining to the gamma rays is thereby canceled out. The power spectrum resulting from the noise is also canceled out in greater part. Thus, the subtracter 31 subtracts the gamma-ray-detector signal power spectrum from the neutron detector signal power spectrum to calculate a neutron-induced power spectrum.

The storage unit 32 of the neutron calculation unit 30 stores the neutron-induced power spectrum calculated in the subtracter 31 (Step S32).

The power-spectrum density calculator 33 receives the neutron-induced power spectrum output from the subtracter 31. The power-spectrum density calculator 33 then calculates the power spectrum density PSD of the neutron-induced power spectrum (Step S33).

Figure 4:
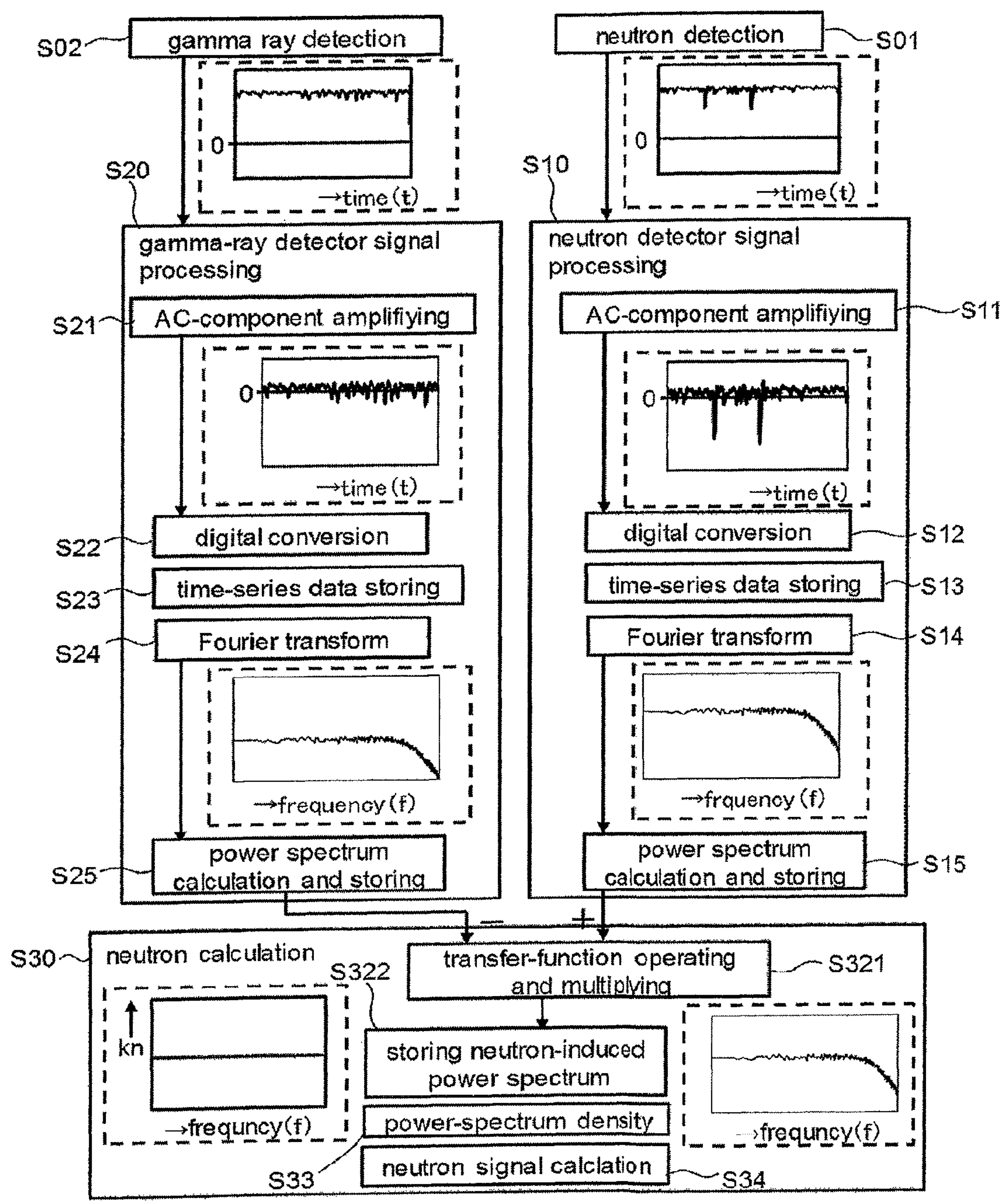
FIG. 4 is a flowchart showing a procedure of a modified power spectrum calculation of the neutron measurement method according to the first embodiment.

FIG. 4 is a flowchart showing a procedure of a modified power spectrum calculation of the neutron measurement method according to the first embodiment. The modified process will be described below.

As shown in FIG. 4, the transfer-function operating and multiplying unit 35 calculates the transfer function, i.e., G(f)=1−(gamma-ray-detector signal power spectrum)/(neutron detector signal power spectrum). The unit 35 then multiplies the transfer function by the power spectrum of the neutron detector signal for each frequency, to obtain G(f)×(power spectrum of the neutron detector signal) for each frequency (Step S21).

As a result, the neutron detector signal power spectrum is multiplied by the ratio of the gamma ray-induced power spectrum contained in the neutron detector-signal power spectrum, and is then cancelled. The power spectrum resulting from noise is also almost cancelled. Thus, the transfer-function operating and multiplying unit 35 subtracts the gamma-ray-detector signal power spectrum from the neutron detector signal power spectrum to output the neutron-induced power spectrum.

The storage unit 32 of the neutron calculation unit 30 stores the neutron-induced power spectrum calculated in the subtracter 31 or in transfer-function operating and multiplying unit 35 (Step S322).

The power-spectrum density calculator 33 receives the neutron-induced power spectrum output from the subtracter 31 in Step S31. The power-spectrum density calculator 33 then calculates the power spectrum density of the neutron-induced power spectrum (Step S33).

The Campbell method measures neutrons, based on the principle that the mean square of the fluctuating component of a signal in the time domain of the neutron detector is proportional to the neutron-intensity level, i.e., neutron flux level.

The following equation (2) is established for the value of the time domain and the value of the frequency domain, in the case of discrete data:

$$\frac{1}{N}\sum_{n=1}^{N}|X(n)|^2=\sum_{k=1}^{N}|X(k)|^2 \tag{2}$$

where N is the number of discrete data items, i.e., data items sampled in a prescribed time, or the number of data items the Fourier transform unit has read during the Fourier transform, X(n) is the value of the data after the Fourier transform, and x(k) is the value in the time domain.

Dividing both sides of the equation (2) by N, we obtain the following equation (3).

$$\frac{1}{N}\sum_{n=1}^{N}|X(n)|^2/N=\frac{1}{N}\sum_{k=1}^{N}|X(k)|^2 \tag{3}$$

The right side of the equation (3) is the mean square for the discrete data in the time domain.

The left side of the equation (3) is the value obtained by dividing the power spectrum density PSD of the neutron-induced frequency data, by the number N of data items. Therefore, the value calculated in the power-spectrum density calculator 33 corresponds to the mean square for the time domain multiplied by inverse of the number N of data items, and hence to the neutron level. That is, the value is proportional to the neutron level.

The neutron signal calculator 34 receives the neutron-induced power spectrum density PSD calculated in Step 33, and multiplies the density PSD by conversion factor kn to generate a neutron signal (Step S34). The conversion factor kn is a constant value, and may have a value for an representative frequency.

When neutron intensity becomes higher than some level and the interval of pulses generated in a neutron detector becomes shorter than the pulse width, the pulses may overlap and form a fluctuating signal. In this case, the frequency spectrum of the fluctuating signal is composed of the spectra of the pulse signals generated as the neutron detector 1 detects neutrons. The characteristic of the frequency spectrum remains unchanged. The pulse signals generated as the gamma ray detector 2 detects gamma rays similarly.

Hence, the method of performing operations for the frequency domain to generate neutron signals according to the present embodiment can be used in a pulse range where the pulse signals generated by detecting neutrons do not overlap. Therefore, not only in neutron intensity level which the Campbell method has been used, but also in lower neutron intensity level, i.e., pulse range, neutron level can be measured according to the present embodiment.

In the conventional gamma-ray compensated neutron detector, the output signal of the gamma-ray compensating unit must be synchronized with the output signal of the neutron sensing unit. On the other hand, in the present embodiment, the output signal of the neutron detector 1 and the output signal of the gamma ray detector 2 are processed respectively in the frequency domain to generate neutron signals free from information in time domain.

In the system according to the present embodiment, any signal output from the neutron detector 1 and any signal output from the gamma ray detector 2 need not be synchronized strictly. Even after the output from the neutron detector 1 and the output signal of gamma ray detector 2 have been measured at different times, if the neutron intensity, i.e., level of the neutron flux does not change during the time, it can be determined by processing the signals.

In the conventional neutron detecting apparatus having a gamma-ray compensating detector, voltages of the opposite polarities are applied to each of the excitation electrode and compensation electrode that oppose the signal electrode common to the neutron sensing unit and gamma-ray compensating unit. Consequently, the ionized electrons have an impact of the self-shielding in one of the neutron sensing unit and gamma-ray compensating unit, much more than in the other unit. In the present embodiment, the neutron detector 1 and the gamma ray detector 2 are independent of each other, and voltages can be applied to them in desirable directions. As a result, neutron detecting apparatus in the present embodiment is free of different influence of the self-shielding as in the conventional neutron detecting apparatus.

In a conventional gamma-ray compensating detector, the difference between the signal output from the neutron sensing unit and the signal output from the gamma-ray compensating unit is acquired as the net of a neutron signal. In order to equalize the gamma-ray contributions in the neutron sensing unit and the gamma-ray compensating unit, the power supplies or amplifiers of these units must be identical in characteristic. It is difficult, however, to manufacture power supplies or amplifiers identical in characteristic.

In the apparatus according to the present embodiment, each of the output signal of the neutron detector 1 and the output signal of the gamma ray detector 2 are converted into digital signals to generate a neutron signal. Hardware adjustment need not, unlike in the conventional neutron detecting apparatus. Hence, the difficulty in measuring becomes lighter than in the conventional neutron detecting apparatus.

Second Embodiment

Figure 5:
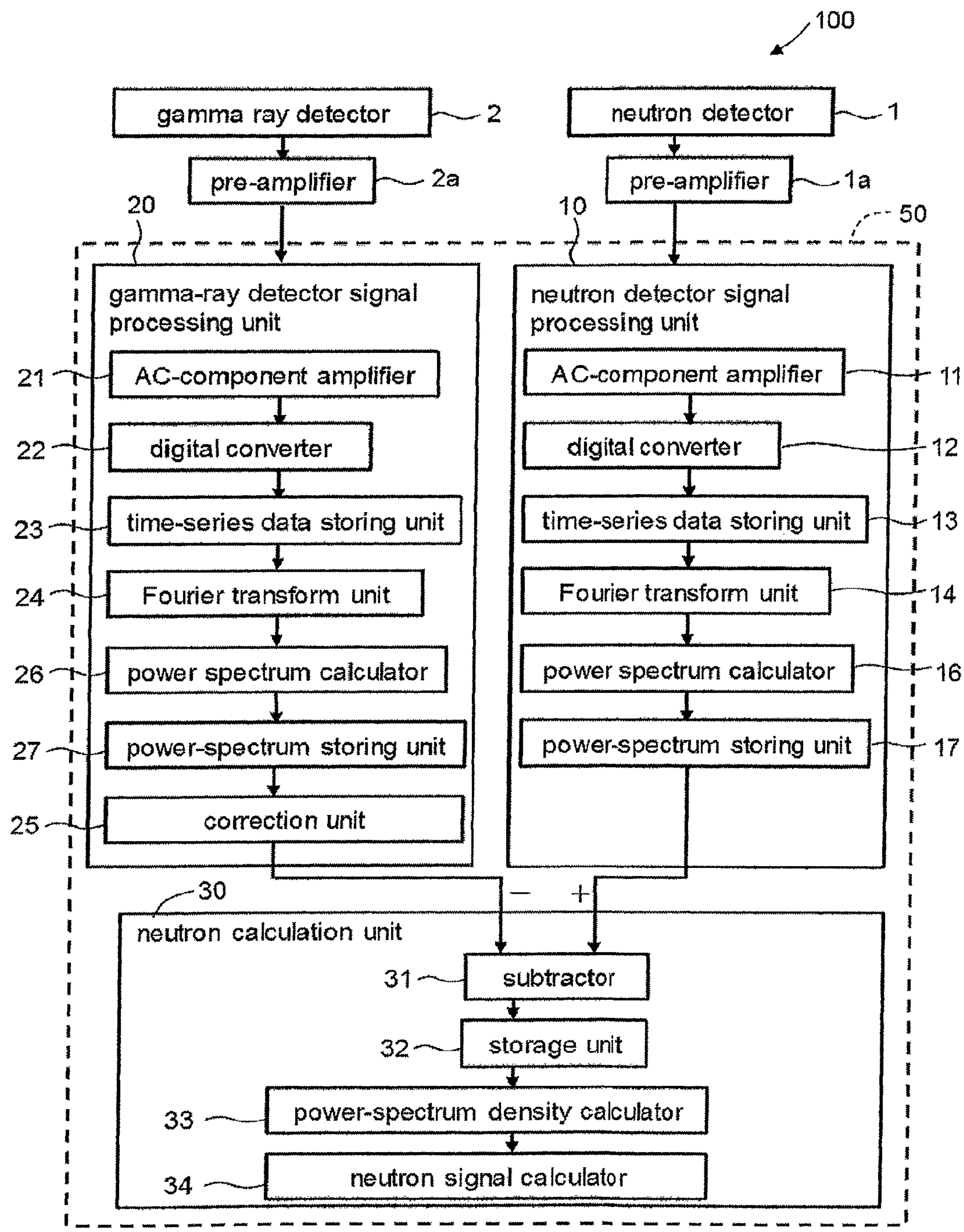
FIG. 5 is a block diagram showing the configuration of a neutron measurement apparatus according to a second embodiment.

FIG. 5 is a block diagram showing the configuration of a neutron measurement apparatus according to a second embodiment. This neutron measurement apparatus is a modification of the apparatus according to the first embodiment. In the neutron calculation apparatus 50 of the neutron measurement apparatus of the present embodiment, the gamma-ray detector signal processing unit 20 has a correction unit 25.

The correction unit 25 corrects the gamma-ray-detector signal power spectrum finally stored in the power-spectrum storing unit 27, equalizing the level of the power spectrum to the level of the gamma-ray contributing part of the signal finally stored in the power-spectrum storing unit 17 of the neutron detector signal processing unit 10. More specifically, the correction unit 25 multiplies, the gamma-ray-detector signal power spectrum output from the power-spectrum storing unit 27 to the subtracter 31, by correction factor C.

The correction factor C is so set that the level of the gamma-ray-detector signal power spectrum finally stored in the power-spectrum storing unit 27 may be equalized to the level of the gamma-ray contributing part of the signal finally stored in the power-spectrum storing unit 17 of the neutron detector signal processing unit 10, as described above.

The value of the correction factor C is gained as the following example. An identical gamma ray source is applied to both the neutron detector 1 and gamma ray detector 2. Signals generated by the neutron detector 1 and gamma ray detector 2 are processed. Assume that the neutron detector signal output from the neutron detector signal processing unit 10 has power spectrum GN(f), and that the gamma-ray detector signal output from the gamma-ray detector signal processing unit 20 has power spectrum GG(f). The neutron detector 1 and gamma ray detector 2 may generate signals at the same time or at different times.

GN(f) and GG(f) may not have the same function form. In this case, the correction factor C is calculated, using equation of C(f)=GN(f)−GG(f). If GN(f) and GG(f) do not much differ in function form, the correction factor C may be obtained by averaging C(f) in the frequency domain.

Note that C(f) may be GN(f)/GG(f), i.e., the ratio of GN(f) to GG(f).

Figure 6:
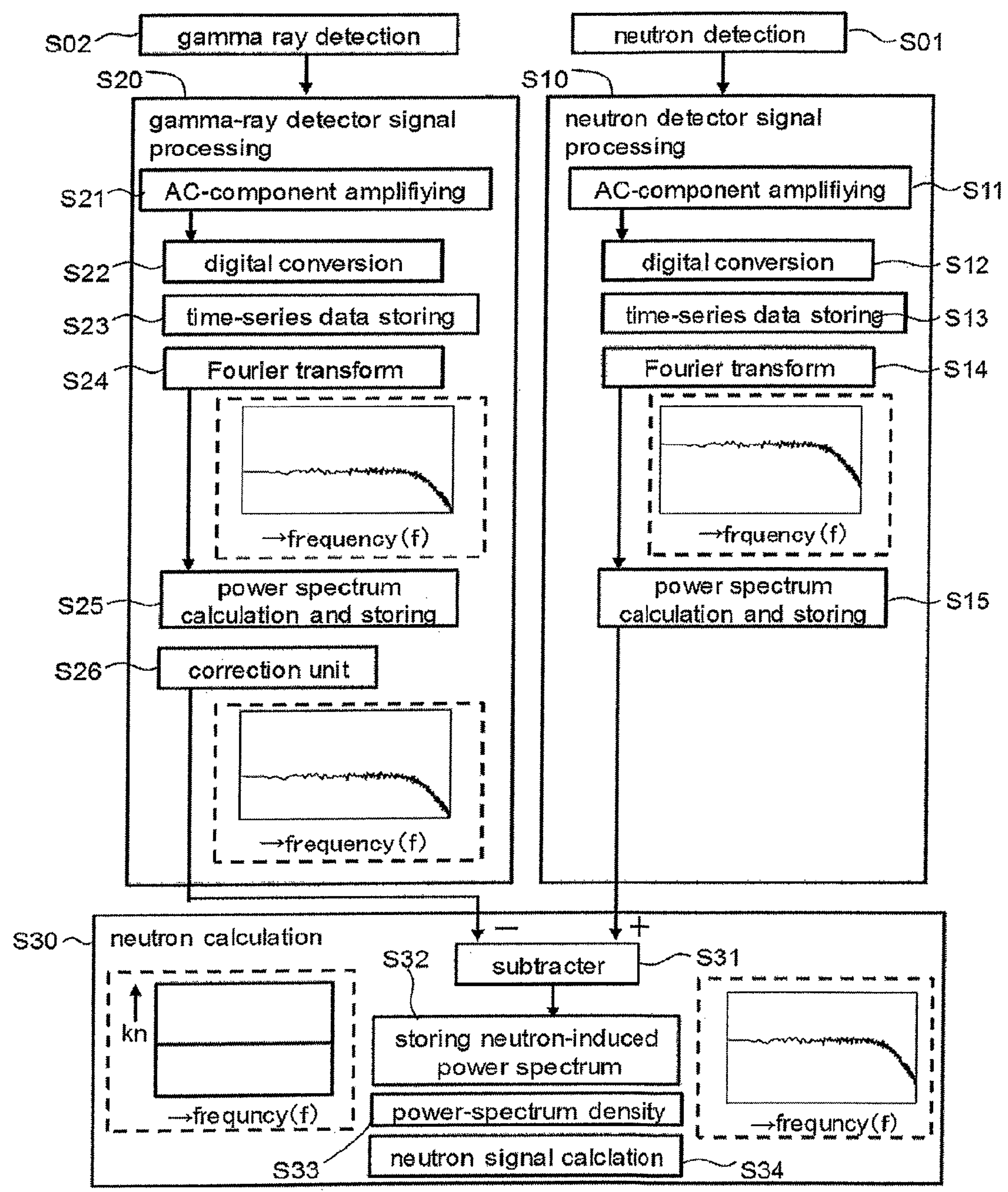
FIG. 6 is a flowchart showing a procedure of a neutron measurement method according to the second embodiment.

FIG. 6 is a flowchart showing a procedure of a neutron measurement method according to the second embodiment. Only the steps different from those performed in the first embodiment will be explained. In Step S20 of processing the gamma-ray detector signal, the correction unit 25 corrects the gamma-ray-detector signal power spectrum stored in the power-spectrum storing unit 27, and outputs the gamma-ray detector signal so corrected to the subtracter 31 (Step S26).

More specifically, the correction unit 25 adds the correction factor C(f) to the gamma-ray-detection signal power spectrum, which is stored in the power-spectrum storing unit 27. If the correction factor C(f) is a ratio, the gamma-ray-detector signal power spectrum is multiplied by the correction factor C(f).

Figure 7:
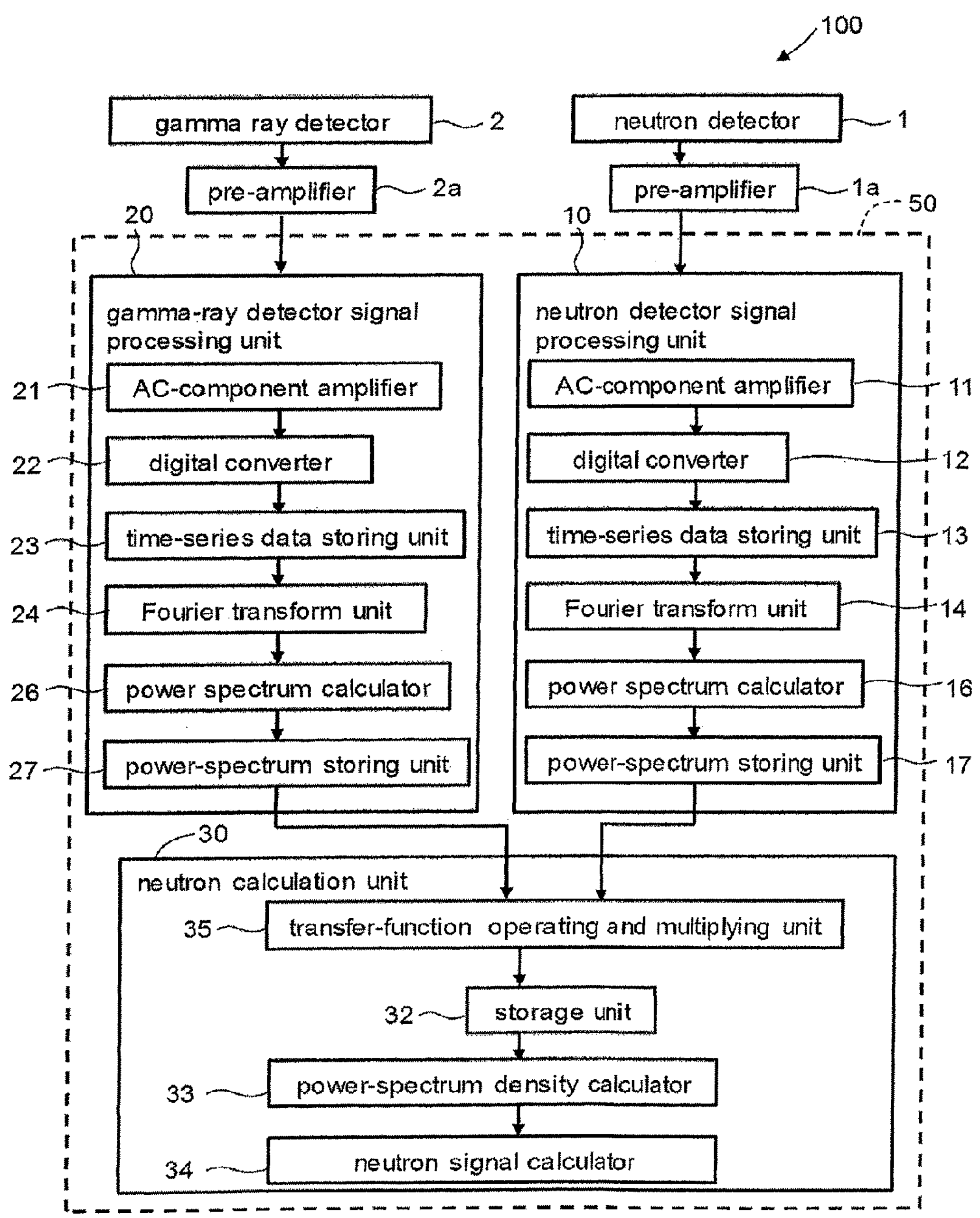
FIG. 7 is a block diagram showing a modified power spectrum calculator of the neutron measurement apparatus according to the second embodiment.

FIG. 7 is a block diagram showing a modified power spectrum calculator of the neutron measurement apparatus according to the second embodiment. In this apparatus, the gamma-ray detector signal processing unit 20 does not have a correction unit 25, and a transfer-function operating and multiplying unit 35 is provided in the neutron calculation unit 30.

In this neutron measurement apparatus, the correction factor C(f) is incorporated into the transfer function G(f), and the transfer function G(f) is calculated as follows:

$$G(f)=1-C(f)\times(\text{gamma-ray-detection signal power spectrum})/(\text{neutron-detection signal power spectrum}) \quad (4)$$

Figure 8:
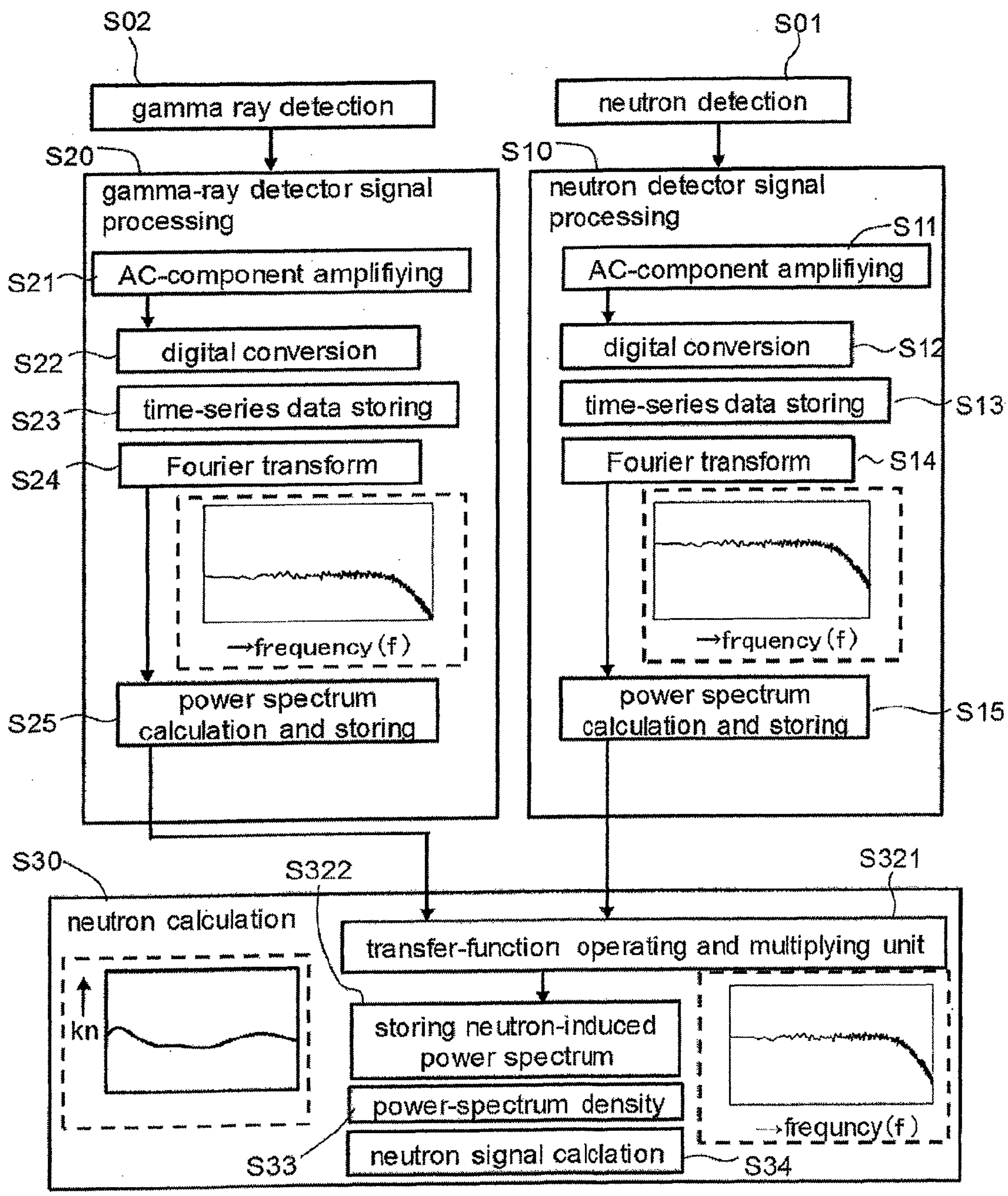
FIG. 8 is a flowchart showing a procedure of a modified power spectrum calculation of the neutron measurement method according to the second embodiment.

FIG. 8 is a flowchart showing a procedure of a modified power spectrum calculation of the neutron measurement method according to the second embodiment. In the neutron calculation unit 30, the transfer-function operating and multiplying unit 35 generates the transfer function G(f) in the same way as shown in FIG. 4 (Step S321) Then, the gamma-ray-detector signal power spectrum is subtracted from the neutron detector signal power spectrum to calculate the neutron-induced power spectrum. The neutron-induced power spectrum so generated is stored and then output (Step S322)

The power spectra of the pulse signals are thus corrected in the second embodiment. Therefore, the gamma rays can be compensated for, even if the characteristics of the neutron detector 1, the pre-amplifier 1*a* and the neutron detector signal processing unit 10 differ from that of the gamma ray detector 2, pre-amplifier 2*a* and gamma-ray detector signal processing unit 20. Moreover, even if the neutron detector 1 and the gamma ray detector 2 are set at different positions, the correction factor C(f) can be set merely by performing calibration accordingly.

Hence, the neutron detector signal processing unit 10 and the gamma-ray detector signal processing unit 20 need not have the same circuit configuration. They may be spaced apart from each other. That is, freedom of design can be ensured for both units 10 and 20.

In the second embodiment, the correction factor C(f) is a function of frequency. If the gamma rays come from a radiation source of only one type, the correction factor can be set for a representative frequency since the shape of signals generated by the gamma rays in each detector is almost same respectively, and the frequency characteristic of output signal from each detector is also almost same respectively. In view of this, the correction factor may be determined from the power spectrum calculated from the output of the neutron detector 1 and the power spectrum calculated from the output of the gamma ray detector 2, while using one gamma ray source.

Third Embodiment

Figure 9:
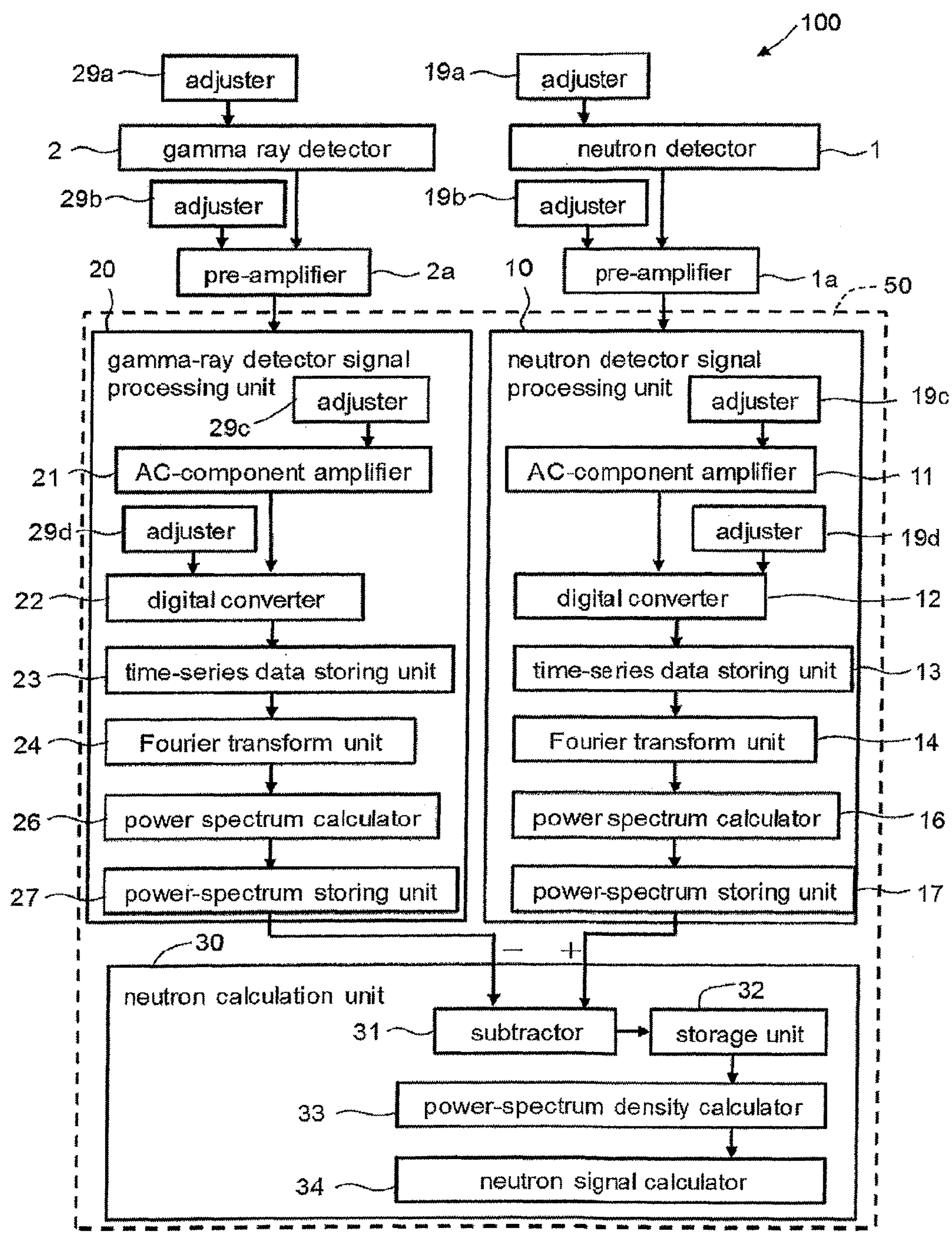
FIG. 9 is a block diagram showing the configuration of a neutron measurement apparatus according to a third embodiment.

FIG. 9 is a block diagram showing the configuration of a neutron measurement apparatus according to a third embodiment.

The third embodiment is a modification of the first embodiment. In the third embodiment, an adjusting unit is connected to each detector and an adjusting unit is connected to each signal processing unit.

To be more specific, the neutron measurement apparatus according to the third embodiment has an adjusting unit 19*a* for adjusting the output of the neutron detector 1, an adjusting unit 19*b* for adjusting the output of the pre-amplifier 1*a*, an adjusting unit 19*c* for adjusting the output of the AC-component amplifier 11 of the neutron detector signal processing unit 10, and an adjusting unit 19*d* for adjusting the output of the digital converter 12 of the neutron detector signal processing unit 10. Further, the neutron measurement apparatus has an adjusting unit 29*a* for adjusting the output of the gamma ray detector 2, an adjusting unit 29*b* for adjusting the output of the pre-amplifier 2*a*, an adjusting unit 29*c* for adjusting the output of the AC-component amplifier 21 of the gamma-ray detector signal processing unit 20, and an adjusting unit 29*d* for adjusting the output of the digital converter 22 of the gamma-ray detector signal processing unit 20.

The adjusting unit 19*a* may be a unit configured to adjust the voltage applied to the neutron detector 1. Similarly, the adjusting unit 29*a* may be a unit configured to adjust the voltage applied to the gamma ray detector 2. The adjusting unit 19*a* may be a gain adjuster for the pre-amplifier 1*a*, and the adjusting unit 29*a* may be a gain adjuster for the pre-amplifier 2*a*.

Figure 10:
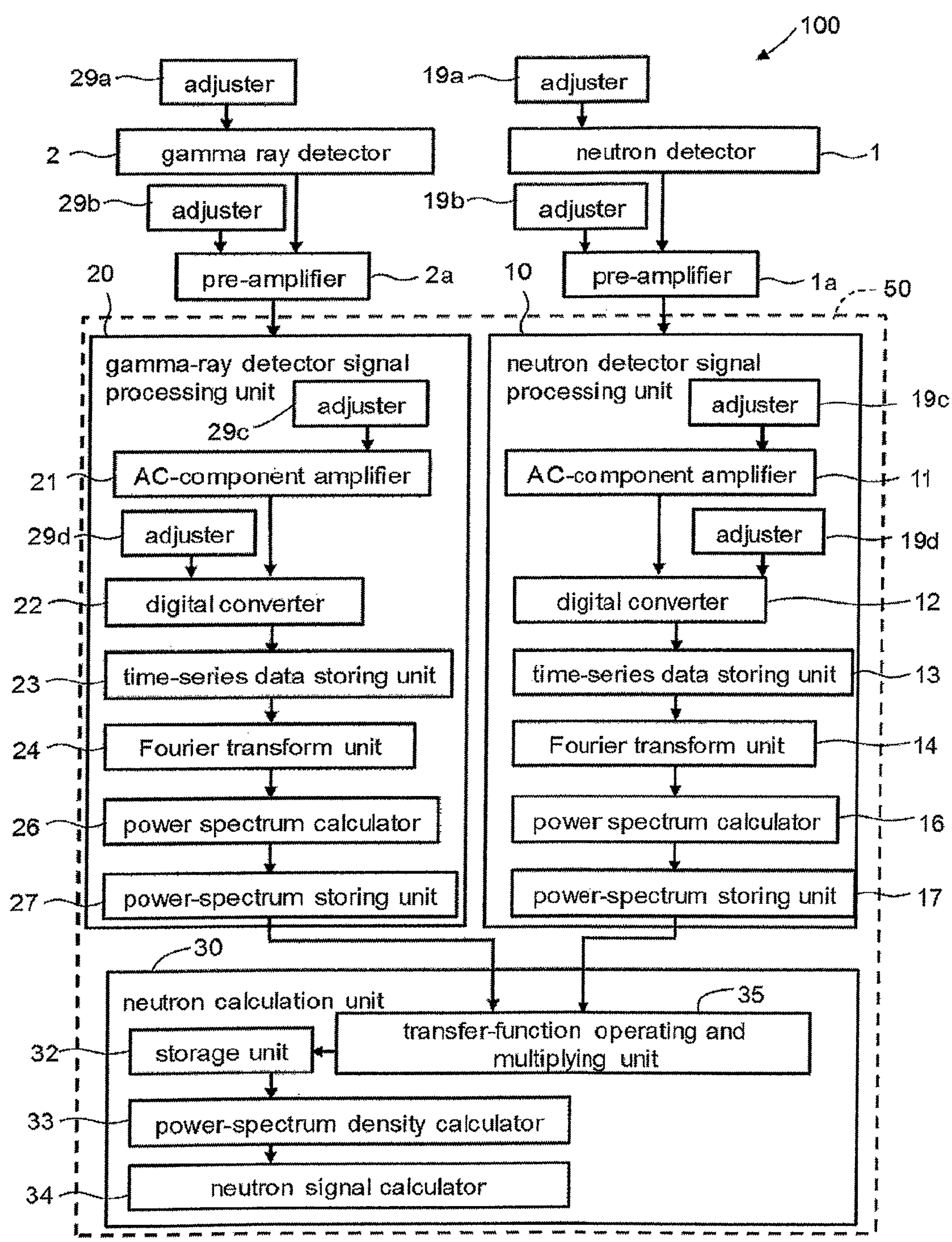
FIG. 10 is a block diagram showing a modified power spectrum calculator of the neutron measurement apparatus according to the third embodiment.

FIG. 10 is a block diagram showing a modified power spectrum calculator of the neutron measurement apparatus according to the third embodiment. As shown in FIG. 10, a transfer-function operating and multiplying unit 35 may be used, instead of subtracter 31, in the neutron calculation unit 30.

In the step of processing the output signal of the neutron detector, thereby first acquiring neutron detector signal frequency data and then calculating the neutron detector signal power spectrum, and in the step of processing the output signal of the neutron detector, thereby first acquiring gamma-ray-detector signal frequency data and then calculating the gamma-ray-detector signal power spectrum, correspondent adjusters adjust each of the level of the gamma-ray contributing part in each stage. This can eliminate the influence of the noise added at some components of the neutron measurement apparatus 100 whenever it happens in each step of processing.

In this embodiment, adjusting units 19*a*, 19*b*, 19*c* and 19*d* are connected to the neutron detector 1, pre-amplifier 1*a*, gamma ray detector 2 and pre-amplifier 2*a*, respectively, and adjusting units 29*a*, 29*b*, 29*c* and 29*d* are connected to the gamma ray detector 2, pre-amplifier 2*a*, AC-component amplifier 21 and digital converter 22, respectively. The third embodiment is not limited to this configuration, nevertheless. For example, the adjusting units may be connected to some of these components only.

Further, adjusting units may be connected to the time-series data storing unit 13 and Fourier transform unit 14 of the neutron detector signal processing unit 10, to the time-series data storing unit 23 or Fourier transform unit 24 of the gamma-ray-detector signal processing unit 20, or to all of them.

Fourth Embodiment

Figure 11:
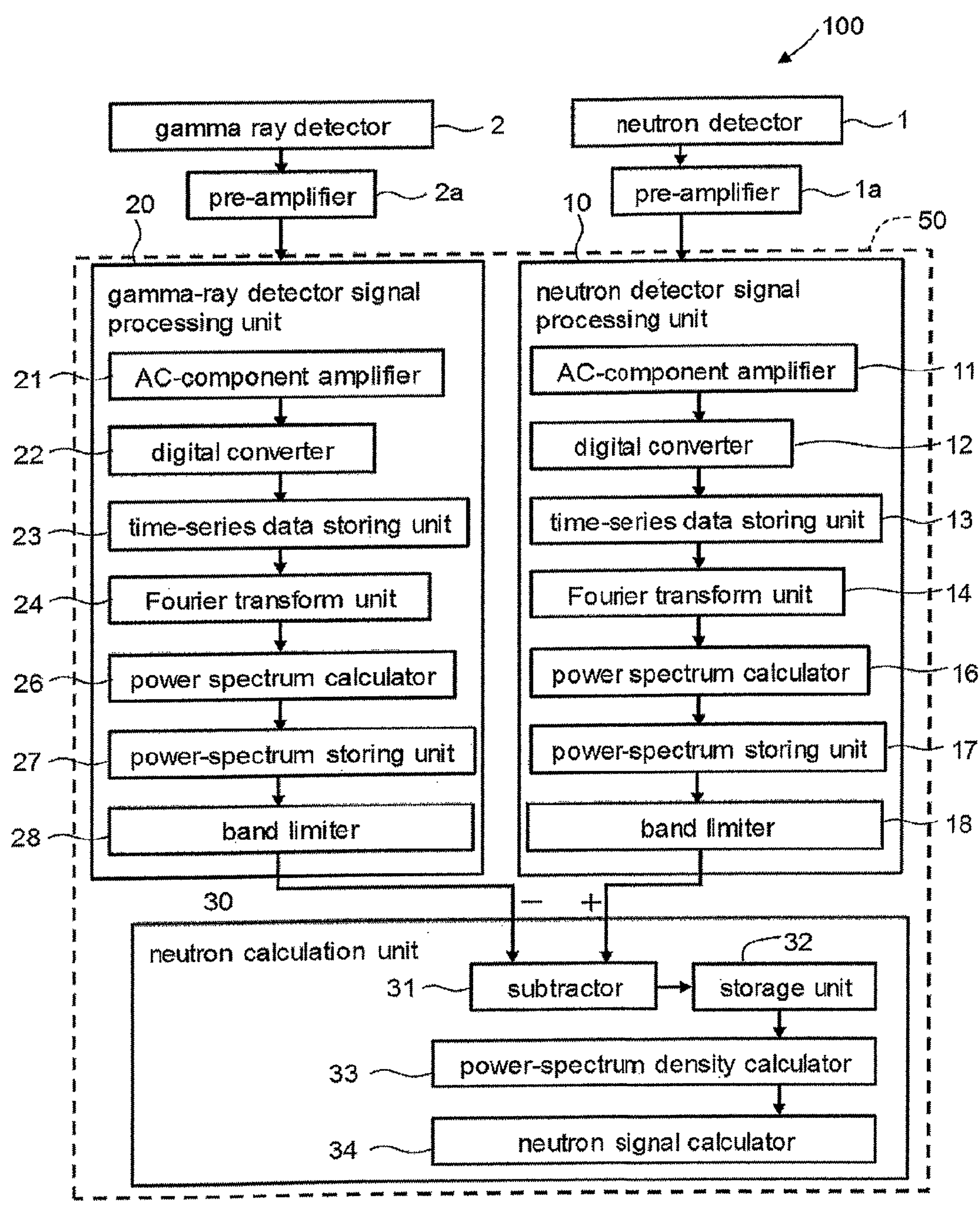
FIG. 11 is a block diagram showing the configuration of a neutron measurement apparatus according to a fourth embodiment.

FIG. 11 is a block diagram showing the configuration of a neutron measurement apparatus according to a fourth embodiment. The fourth embodiment is a modification of the first embodiment. In the fourth embodiment, the neutron detector signal processing unit 10 has a band limiter 18, and the gamma-ray detector signal processing unit 20 has a band limiter 28.

The band limiters 18 and 28 select the same frequency band. More precisely, the band limiters 18 and 28 select a frequency band in accordance with the frequency band of the signals detected in the neutron detector 1.

The band limiters 18 and 28 thus select only the frequency component of the neutron-induced signal. Therefore, factors resulting from anything other than the neutrons can be removed as much as possible, and any output signal performed Fourier transform resulting from gamma rays identical in frequency domain to the signal resulting from neutrons can be removed.

Figure 12:
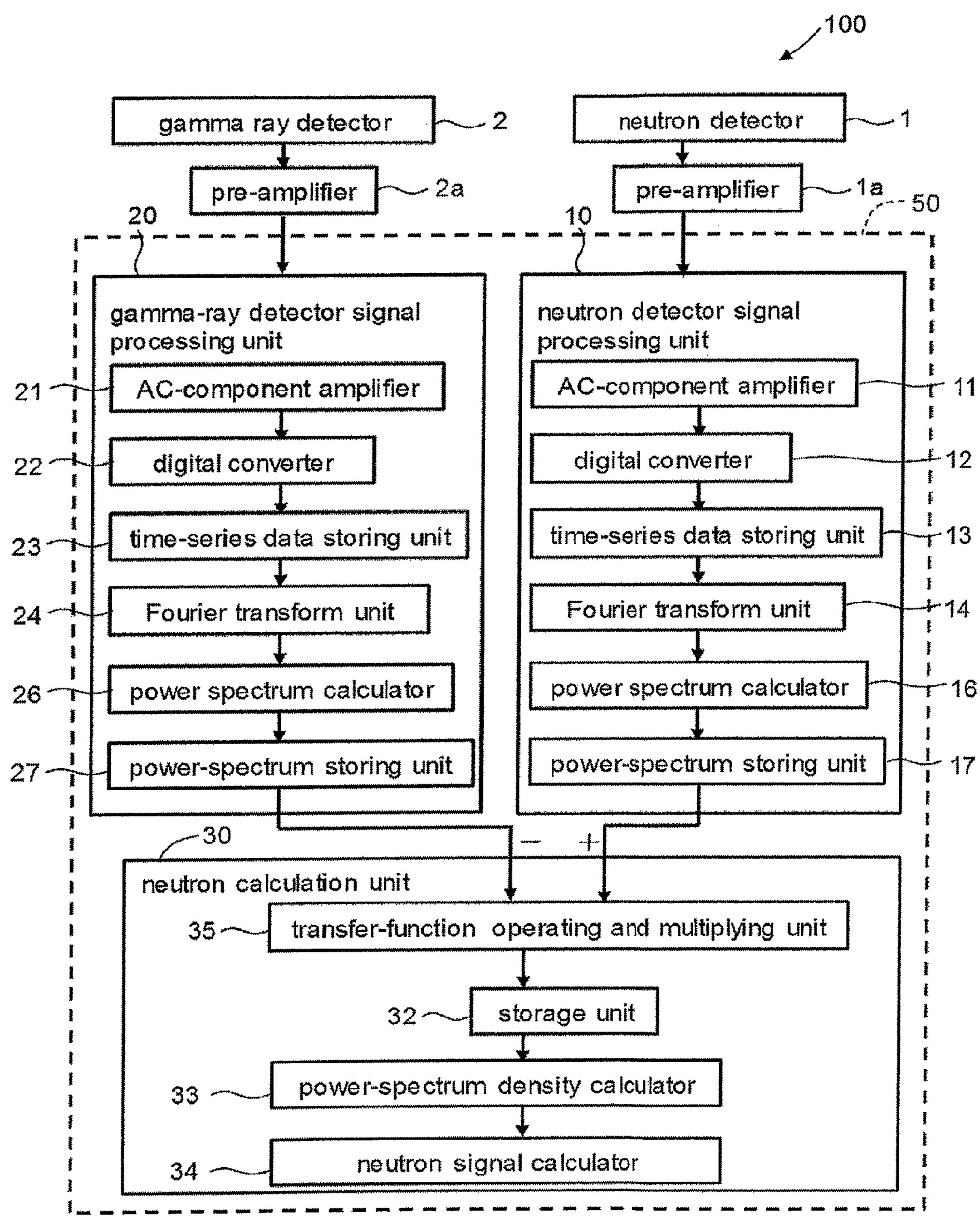
FIG. 12 is a block diagram showing the configuration of a modified neutron measurement apparatus according to the fourth embodiment.

FIG. 12 is a block diagram showing the configuration of a modified neutron measurement apparatus according to the fourth embodiment.

In the fourth embodiment, the neutron detector processing unit 10 has a band limiter 18, the gamma-ray detector signal processing unit 20 has a band limiter 28, and the neutron detector signal processing unit 10 has a subtracter 35.

In the present modified neutron measurement apparatus, instead of those elements in the fourth embodiment, a transfer-function operating and multiplying unit 35 is provided in the neutron calculation unit 30.

The transfer-function operating and multiplying unit 35 is similar, in structure and function, to the modified power spectrum operation unit used in the neutron measurement apparatus according to the first embodiment, which is shown in FIG. 2 and FIG. 4. However, the transfer function, i.e., G(f), is set to 0 in the frequency band other than those selected by above band limiters 18 and 28, i.e., the frequency band of the signals detected in the neutron detector In the apparatus so configured, the neutron-induced power spectrum has highly correlation with the intensity of the incident neutrons to the neutron detector 1. The power spectrum can therefore maintain linearity over a broad range in respect to the intensity of neutrons.

Fifth Embodiment

Figure 13:
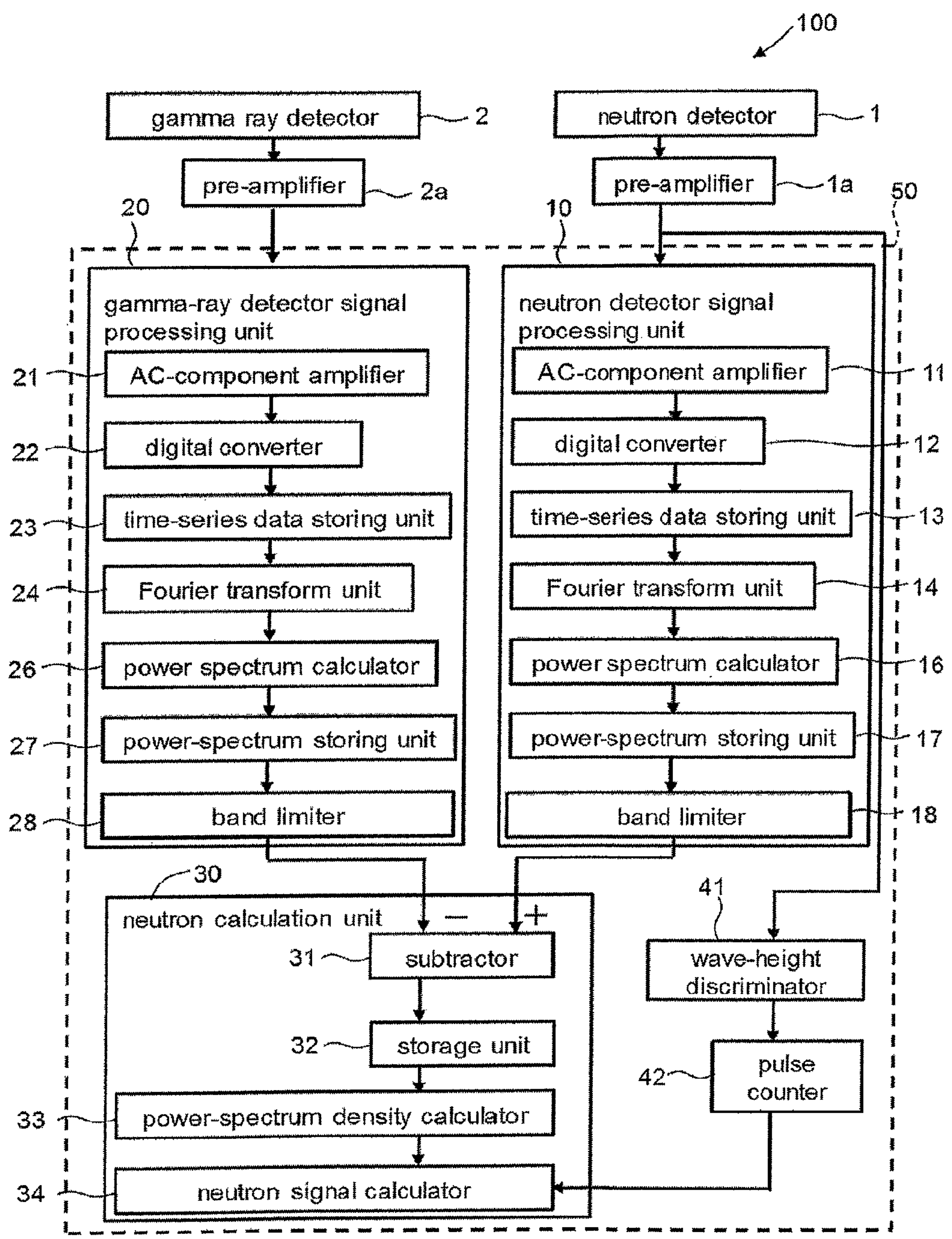
FIG. 13 is a block diagram showing the configuration of a neutron measurement apparatus according to a fifth embodiment.

FIG. 13 is a block diagram showing the configuration of a neutron measurement apparatus according to a fifth embodiment. The fifth embodiment is a modification of the first or fourth embodiment. In the fifth embodiment, the neutron calculation apparatus 50 has a wave-height discriminator 41 and a pulse counter 42. The wave-height discriminator 41 receives the signal output from the pre-amplifier 1*a,* discriminates the wave height of the signal, and outputs a result of discrimination to the pulse counter 42. The pulse counter 42 counts signals received from the wave-height discriminator 41 and outputs the count to the neutron signal calculator 34.

In the measuring process in the pulse range, most pulse signals generated from the neutrons have levels a several times as high as the pulse signals generated from gamma rays. Therefore, only pulse signals higher than a prescribed level are passed, thereby removing pulse signals generated from gamma rays.

Hence, the pulse counter 42 connected to the output of the wave-height discriminator 41 counts only the pulse signals generated from neutrons.

The neutron signal calculator 34 multiplies, by conversion factor kn, the power spectrum density PSD calculated from the neutron-induced power spectrum in the frequency domain, thereby to generate a neutron signal. While multiplying the density PSD by conversion factor kn, the neutron signal calculator 34 receives neutron signal from the pre-amplifier 1*a* directly.

Thus, by this embodiment, the neutron intensity range where the signal-counting scheme in the frequency domain (the FFT Applied Campbell Method) is applicable, i.e., Campbell Range can be expanded to the neutron intensity range where the neutrons can be counted individually, i.e., Pulse Range. Therefore, the neutron count signal can be utilized as benchmark of any operation performed in the neutron signal calculator 34.

Figure 14:
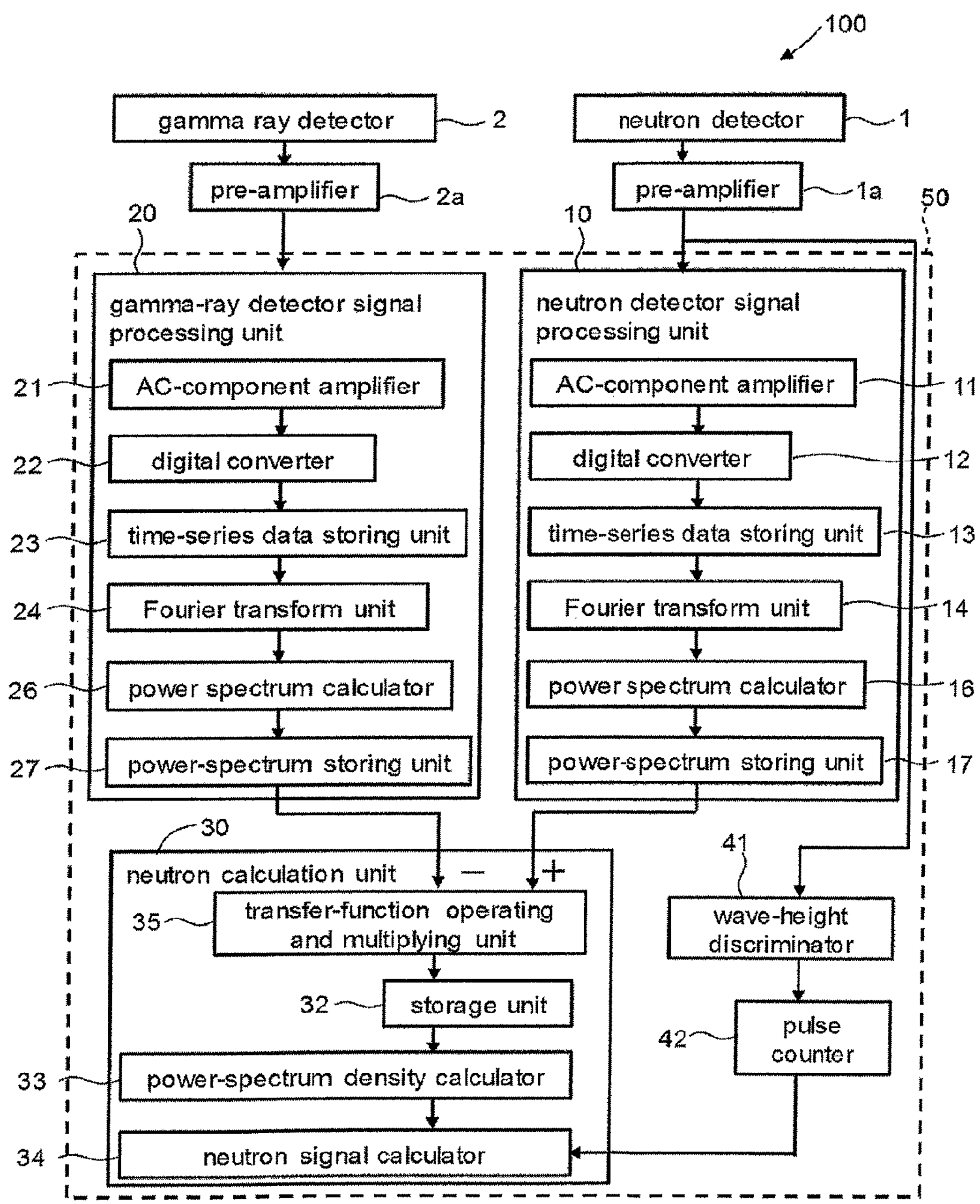
FIG. 14 is a block diagram showing the configuration of a modified neutron measurement apparatus according to the fifth embodiment.

FIG. 14 is a block diagram showing the configuration of a modified neutron measurement apparatus according to the fifth embodiment. As shown in FIG. 14, the neutron calculation unit 30 has a transfer-function operating and multiplying unit 35, which are used in place of the band limiters 18 and 28 and subtracter 31.

Figure 15:
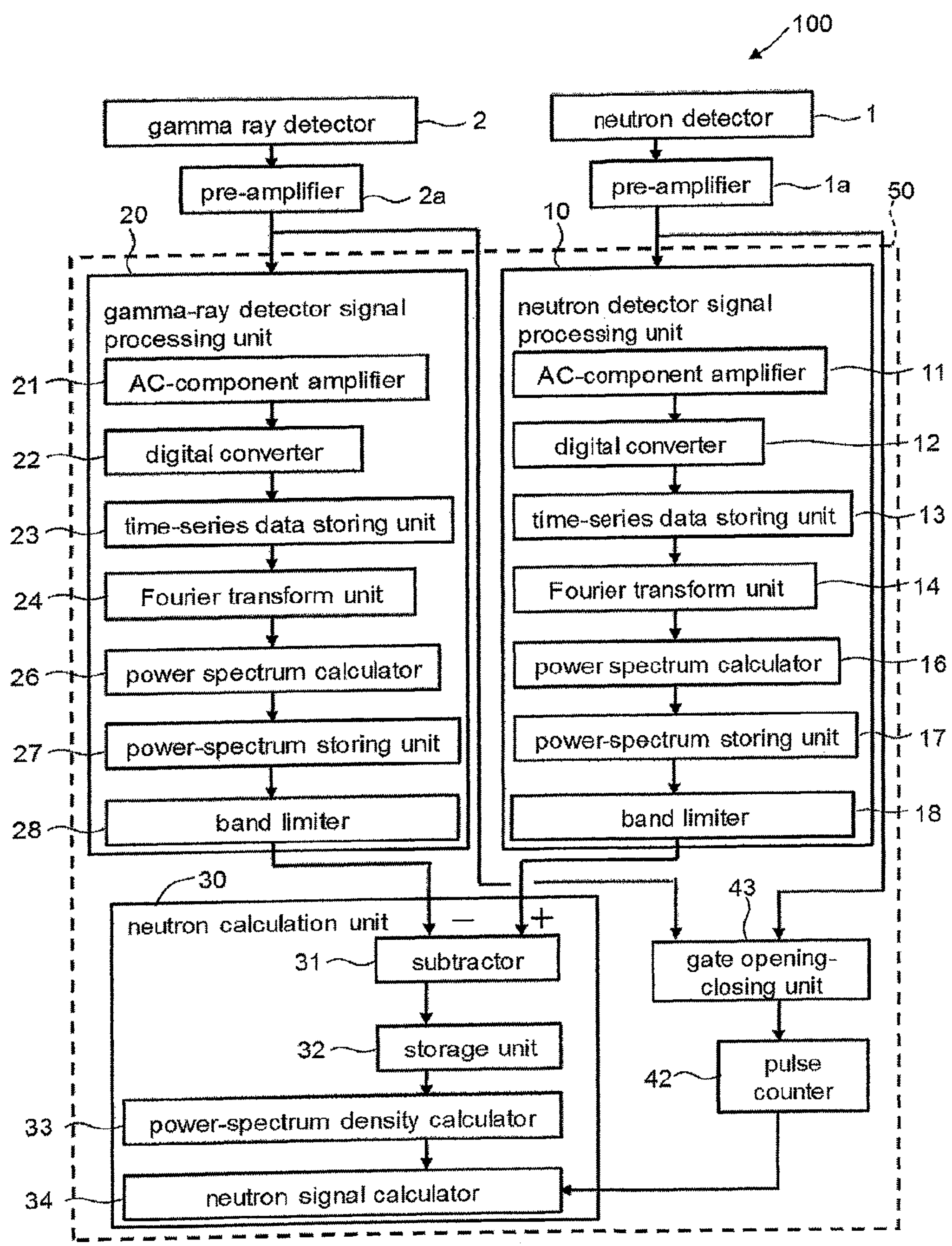
FIG. 15 is a block diagram showing the configuration of first modified neutron measurement apparatus according to the fifth embodiment.

FIG. 15 is a block diagram showing the configuration of the first modified neutron measurement apparatus according to the fifth embodiment. This modification has a gate opening-closing unit 43 instead of the wave-height discriminator 41. When a signal is input to the gamma-ray detector signal processing unit 20 from the gamma ray detector 2, the gate opening-closing unit 43 closes so that the pulse counter 42 may not count this signal. Hence, the neutron measurement apparatus of FIG. 15 achieves the same advantage as the apparatus shown in FIG. 13.

Figure 16:
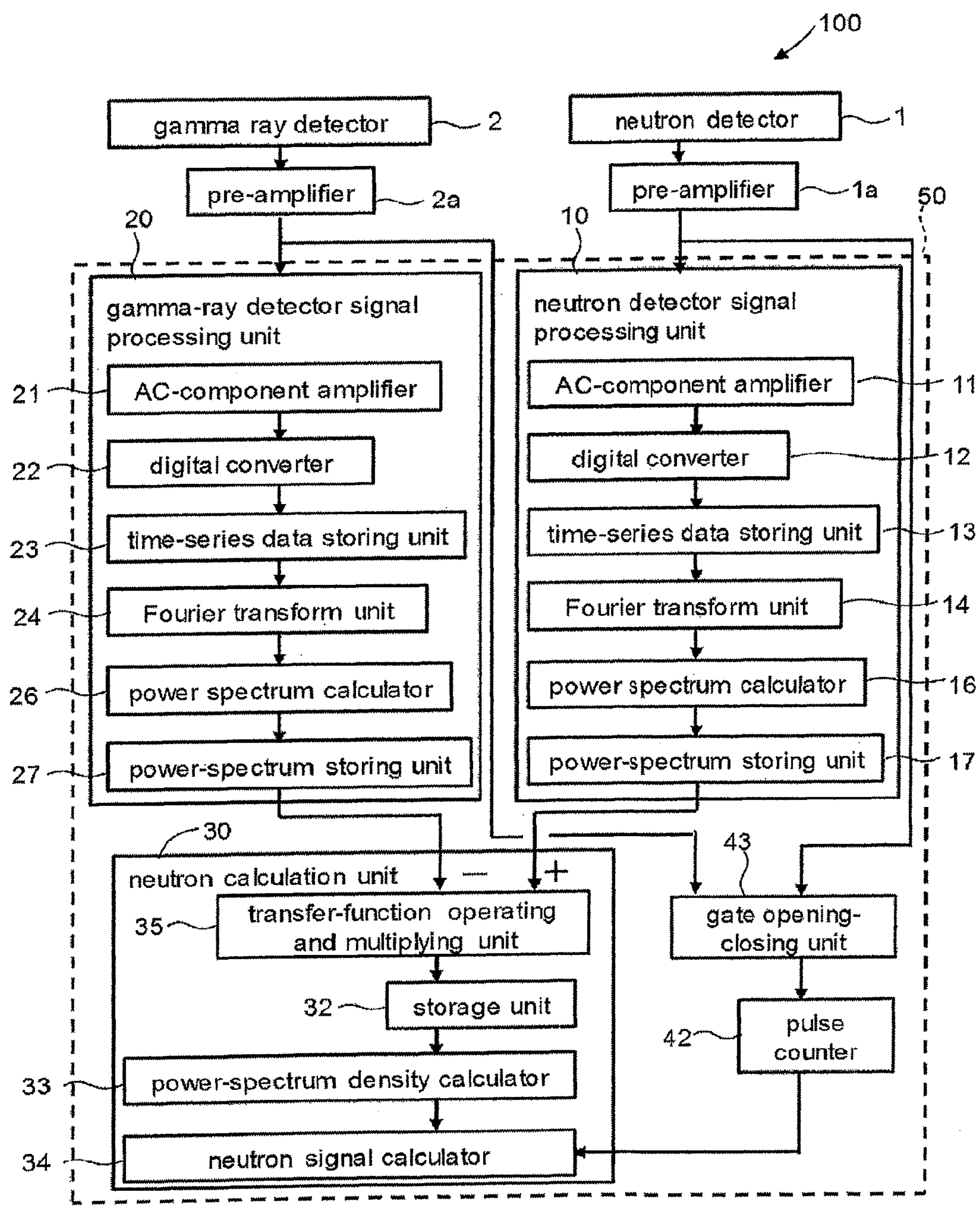
FIG. 16 is a block diagram showing the configuration of a modified power-spectrum operation unit in the first modified neutron measurement apparatus according to the fifth embodiment.

FIG. 16 is a block diagram showing the configuration of a modified power-spectrum operation unit in the first modified neutron measurement apparatus according to the fifth embodiment. The configuration of the neutron detector processing unit 10, the gamma-ray detector signal processing unit 20, and the neutron calculation unit 30 in FIG. 16 are same as that in FIG. 14.

Figure 17:
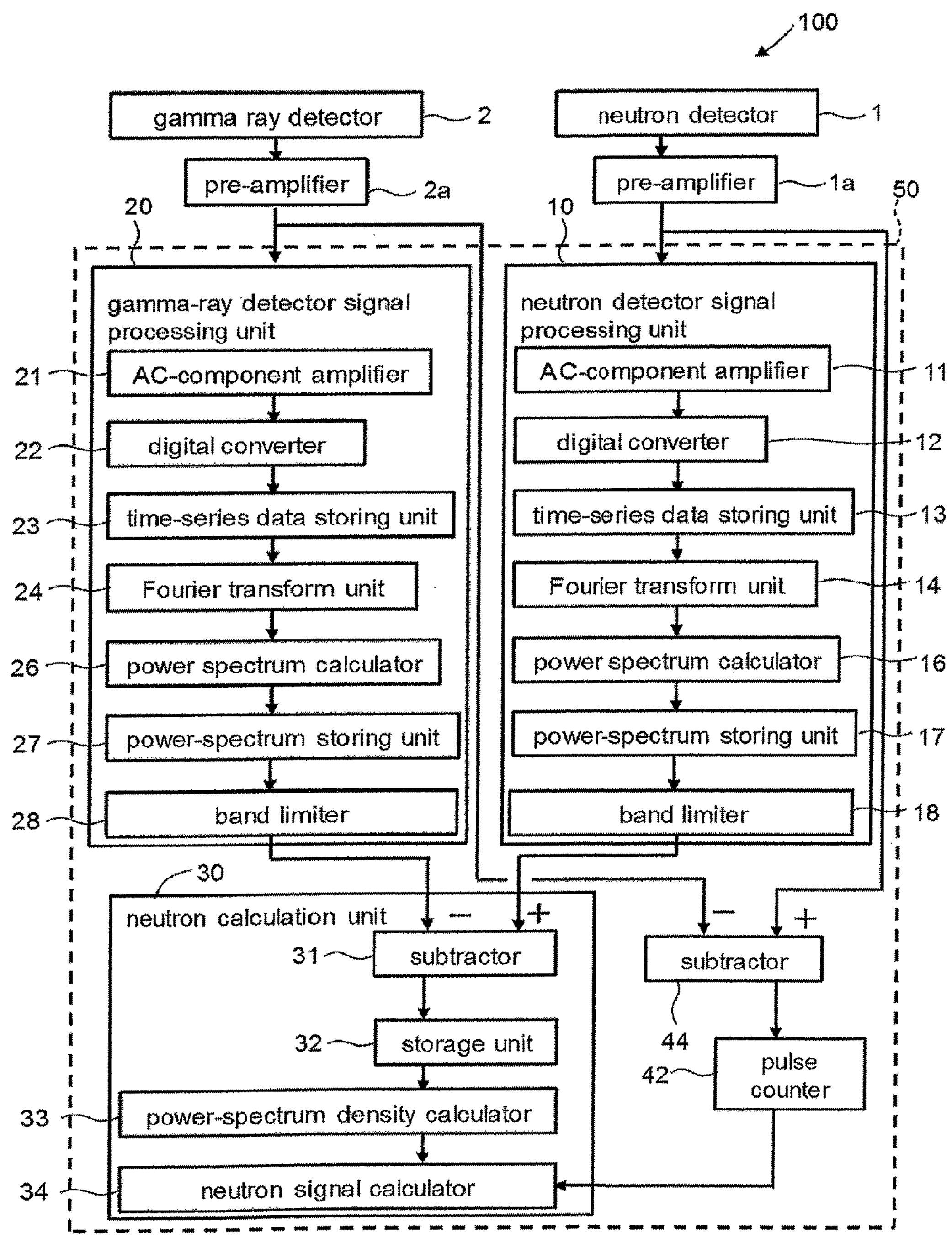
FIG. 17 is a block diagram showing the configuration of the second modified neutron measurement apparatus according to the fifth embodiment.

FIG. 17 is a block diagram showing the configuration of the second modified neutron measurement apparatus according to the fifth embodiment. The second modified neutron measurement apparatus has a subtracter 44 instead of the wave-height discriminator 41. The subtracter 44 subtracts the level of a voltage signal output from the pre-amplifier 2*a* of the gamma-ray detector 2 from the level of a voltage signal output from the pre-amplifier 1*a* of the neutron detector 1, removing the component resulting from gamma rays and gaining the voltage-signal level resulting from neutrons.

Figure 18:
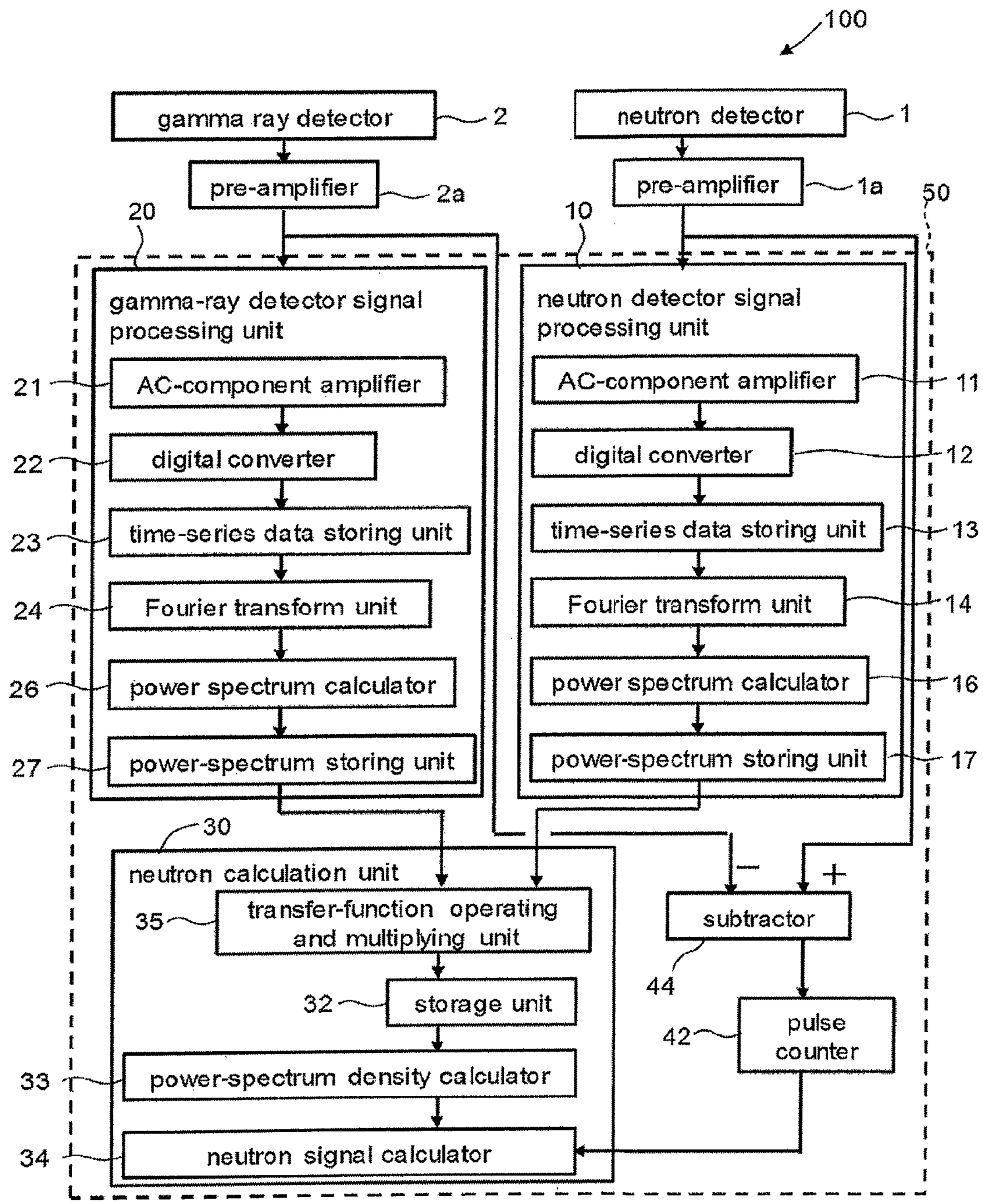
FIG. 18 is a block diagram showing the configuration of a modified power-spectrum operation unit in the second modified neutron measurement apparatus according to the fifth embodiment.

FIG. 18 is a block diagram showing the configuration of a modified power-spectrum operation unit in the second modified neutron measurement apparatus according to the fifth embodiment. The characterizing part of this apparatus is identical to the part specified in FIG. 14.

Figure 19:
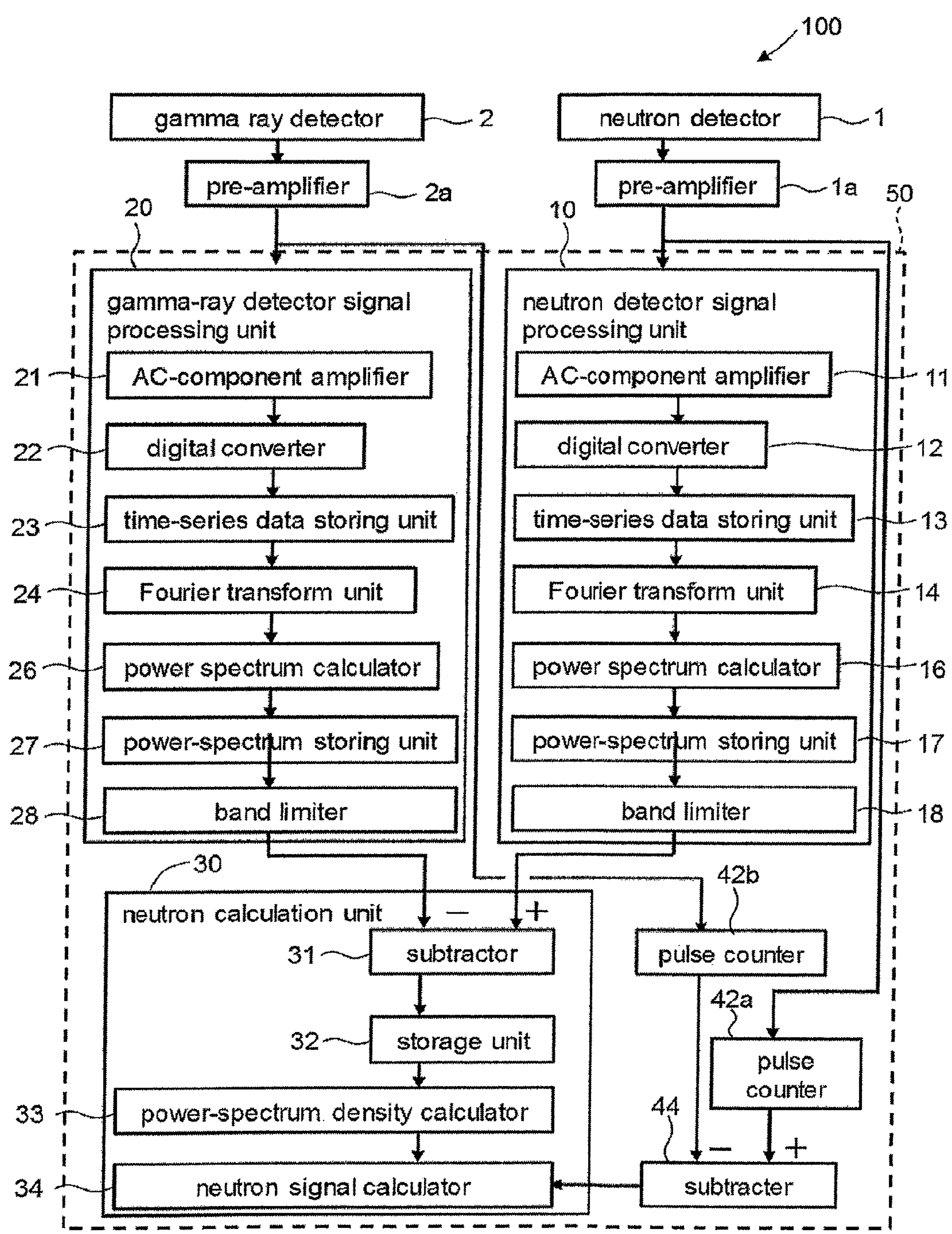
FIG. 19 is a block diagram showing the configuration of the third modified neutron measurement apparatus according to the fifth embodiment.

FIG. 19 is a block diagram showing the configuration of the third modified neutron measurement apparatus according to the fifth embodiment. This apparatus has a pulse counter 42*a* for counting the signals output from the pre-amplifier 1*a* of the neutron detector 1, a pulse counter 42*b* for the counting signals output from the pre-amplifier 2*a* of the gamma-ray detector 2, and a subtracter 44.

The pulse counter 42*a* counts pulses resulting from neutrons and gamma rays. The pulse counter 42*b* counts pulses resulting from gamma rays. The subtracter 44 performs subtraction, finding the number of pulses resulting from neutrons. The data representing the number is output to the neutron signal calculator 34.

The process and advantage the neutron signal calculator 34 performs and achieves are similar to those performed and achieved in the apparatuses of FIG. 13, FIG. 15 and FIG. 17.

Figure 20:
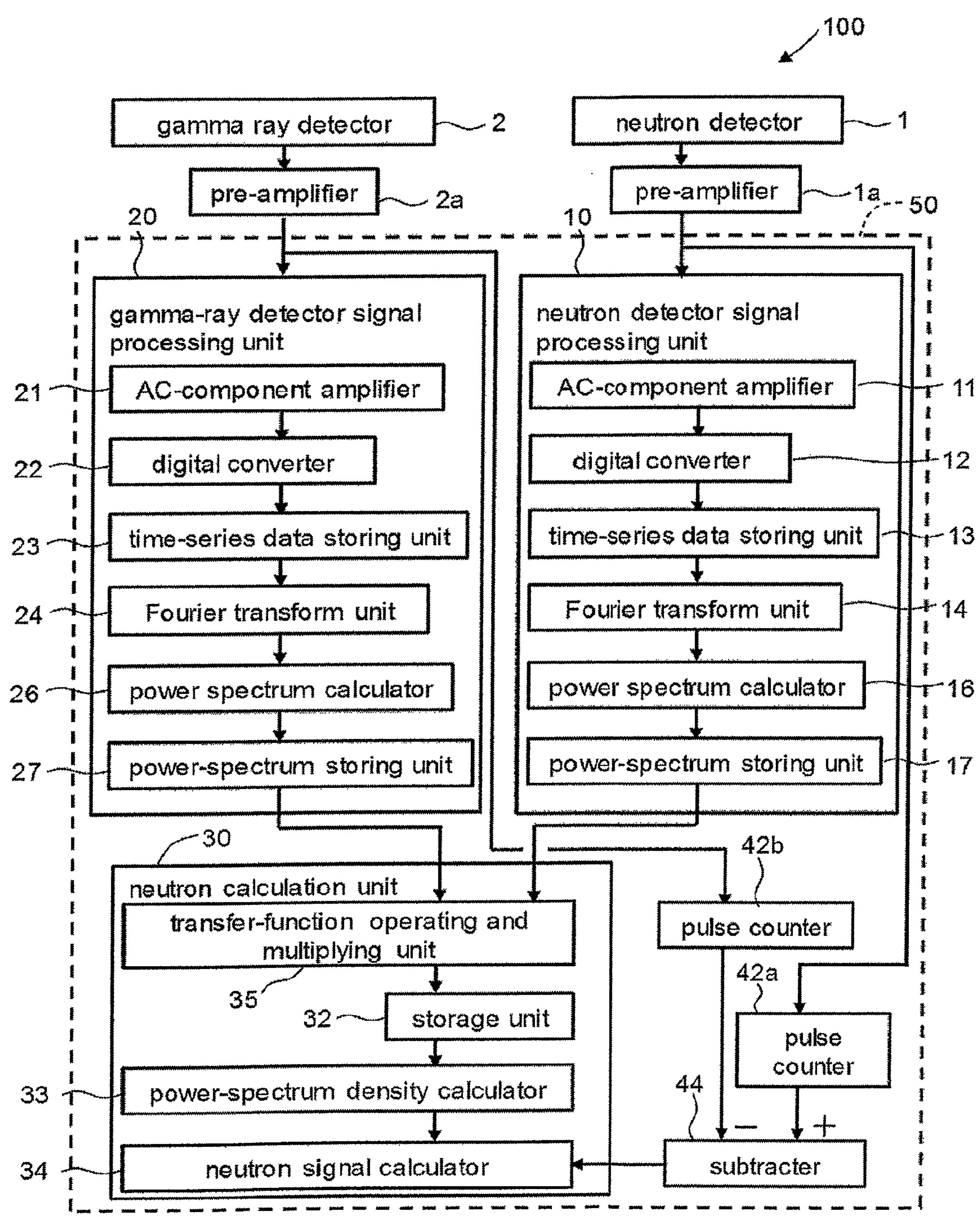
FIG. 20 is a block diagram showing the configuration of a modified power-spectrum operation unit in the third modified neutron measurement apparatus according to the fifth embodiment.

FIG. 20 is a block diagram showing the configuration of a modified power-spectrum operation unit in the third modified neutron measurement apparatus according to the fifth embodiment. In this neutron measurement apparatus, the power spectrum operation unit is modified in the same way as in the modification of FIG. 14.

Sixth Embodiment

Figure 21:
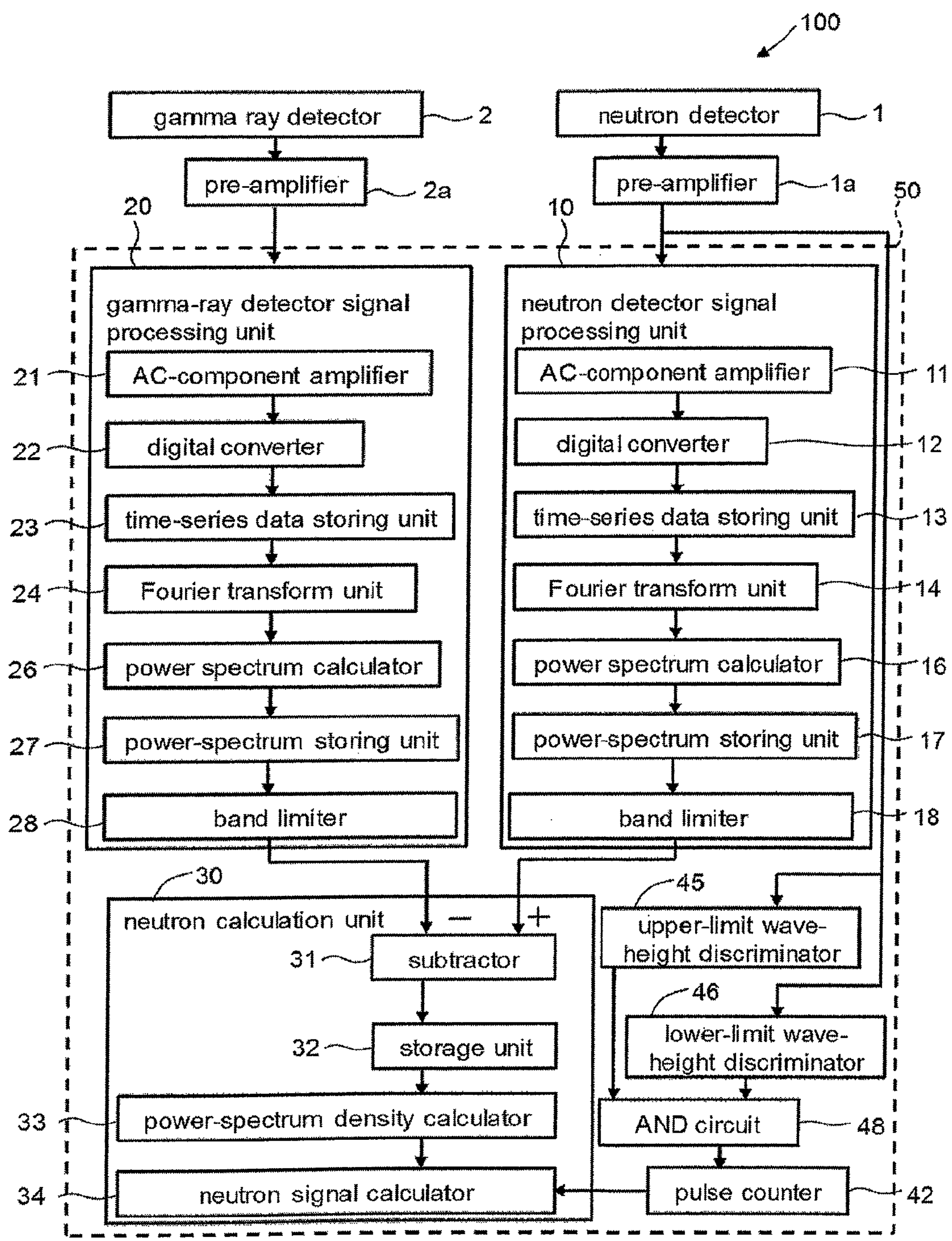
FIG. 21 is a block diagram showing a neutron measurement apparatus according to a sixth embodiment.

FIG. 21 is a block diagram showing a neutron measurement apparatus according to a sixth embodiment. In this neutron measurement apparatus, the neutron calculation apparatus 50 has an upper-limit wave-height discriminator 45, a lower-limit wave-height discriminator 46, an AND circuit 48, and a pulse counter 42.

The upper-limit wave-height discriminator 45 passes any signal having a wave height equal to or lower than a prescribed upper-limit value. The lower-limit wave-height discriminator 46 passes any signal having a wave height equal to or higher than a prescribed lower-limit value. The AND circuit 48 outputs the signals that have passed through the upper-limit wave-height discriminator 45 and lower-limit wave-height discriminator 46. The pulse counter 42 counts the signals output from the AND circuit 48, and outputs the count to the neutron signal calculator 34 of the neutron calculation unit 30.

For the pulse signals generated from gamma rays, the upper-limit value and the lower-limit value are so set that the AND conditions may be established.

The neutron signal calculator 34 receives a value proportional to the neutron intensity from the power-spectrum density calculator 33, and multiplies the value by the conversion factor. The neutron signal calculator 34 also receives a gamma-ray pulse signal from the pulse counter 42, and can therefore roughly determine whether the level of the conversion factor is appropriate or not.

If the neutron intensity is at a low level, the count of gamma rays is relatively large. Conversely, if neutron intensity is at a high level, the count of gamma rays is relatively small. If this relation is known beforehand, it can determine whether the neutron intensity determined by processing signals in the frequency domain is correct or not.

Figure 22:
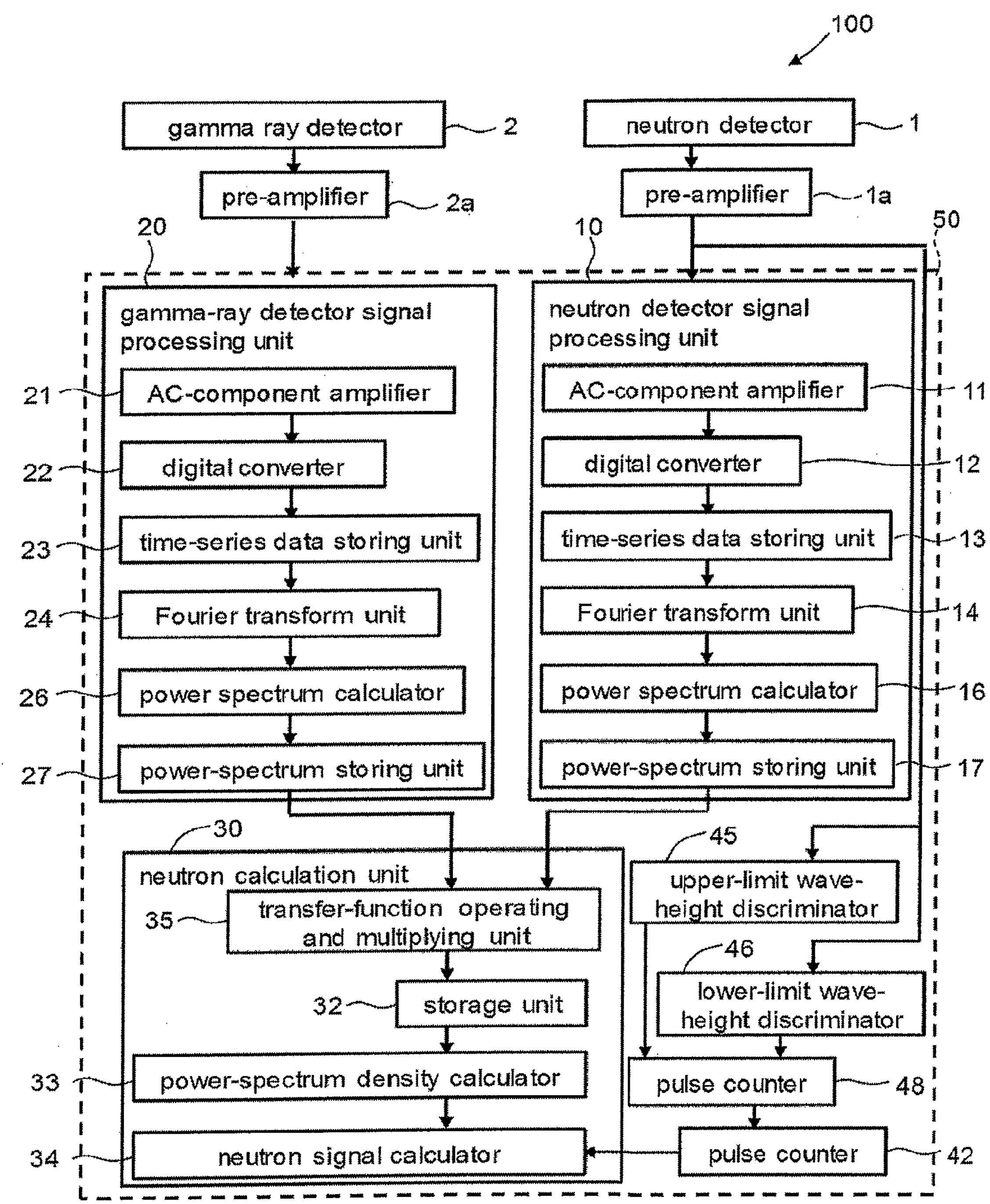
FIG. 22 is a block diagram showing a modified power spectrum calculator of the neutron measurement apparatus according to the sixth embodiment.

FIG. 22 is a block diagram showing a modified power spectrum calculator of the neutron measurement apparatus according to the sixth embodiment. In this neutron measurement apparatus, a transfer-function operating and multiplying unit 35 is provided in the neutron calculation unit 30, in place of the band limiters 18 and 28 and subtracter 31.

Figure 23:
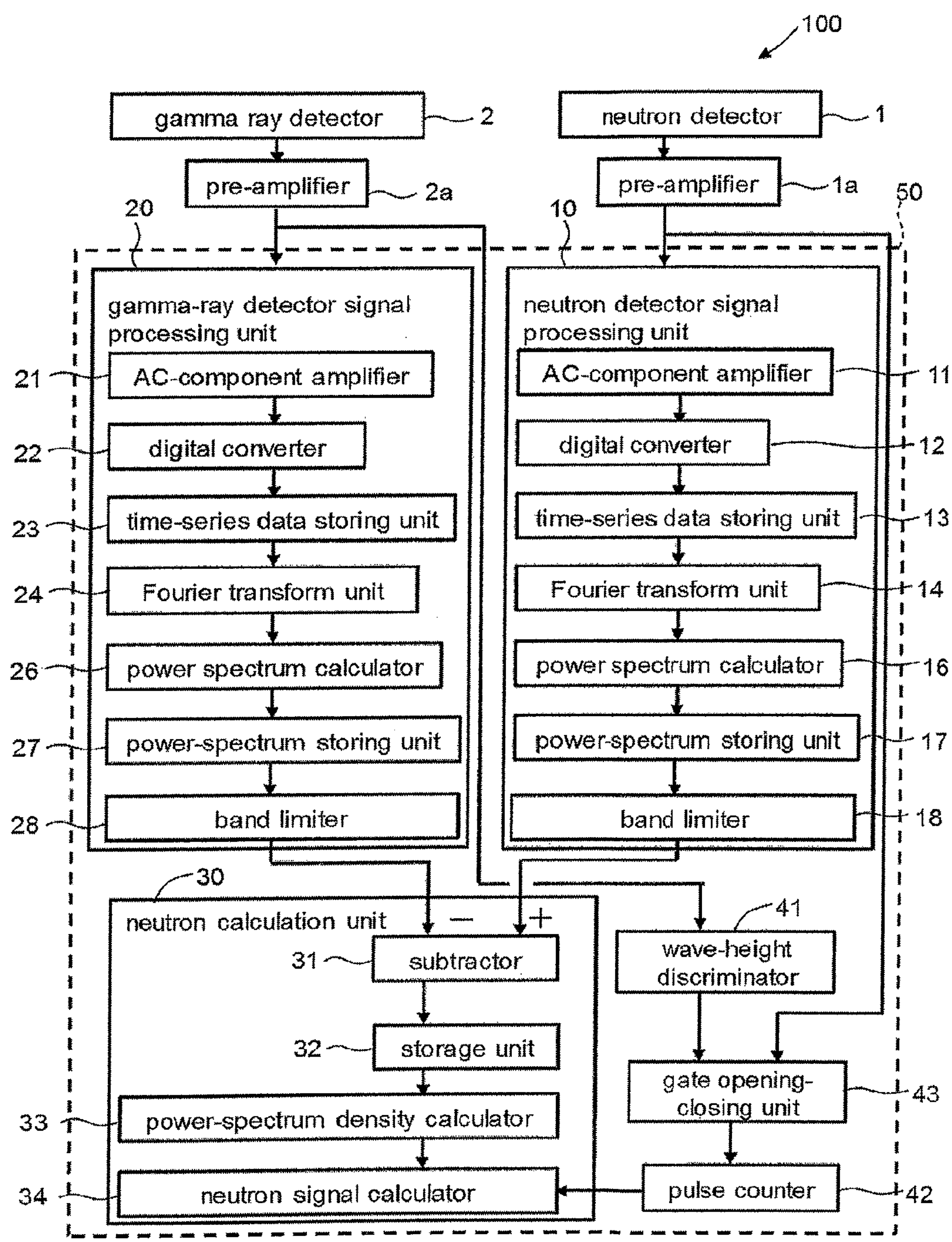
FIG. 23 is a block diagram showing a modified neutron measurement apparatus according to the sixth embodiment.

FIG. 23 is a block diagram showing a modified neutron measurement apparatus according to the sixth embodiment. In this neutron measurement apparatus, the neutron calculation apparatus 50 has a wave-height discriminator 41, a gate opening-closing unit 43, and a pulse counter 42. The wave-height discriminator 41 passes only pulse signals higher than a prescribed level. That is, it blocks the pulse signals resulting from gamma rays, and passes the neutron signals only.

The gate opening-closing unit 43 closes the gate when it receives a pulse signal resulting from neutrons. The pulse counter 42 therefore counts the pulse signals resulting from gamma rays, and outputs the count to the neutron signal calculator 34. Thus, this modified neutron measurement apparatus also achieves the same advantage as the sixth embodiment of the invention.

Figure 24:
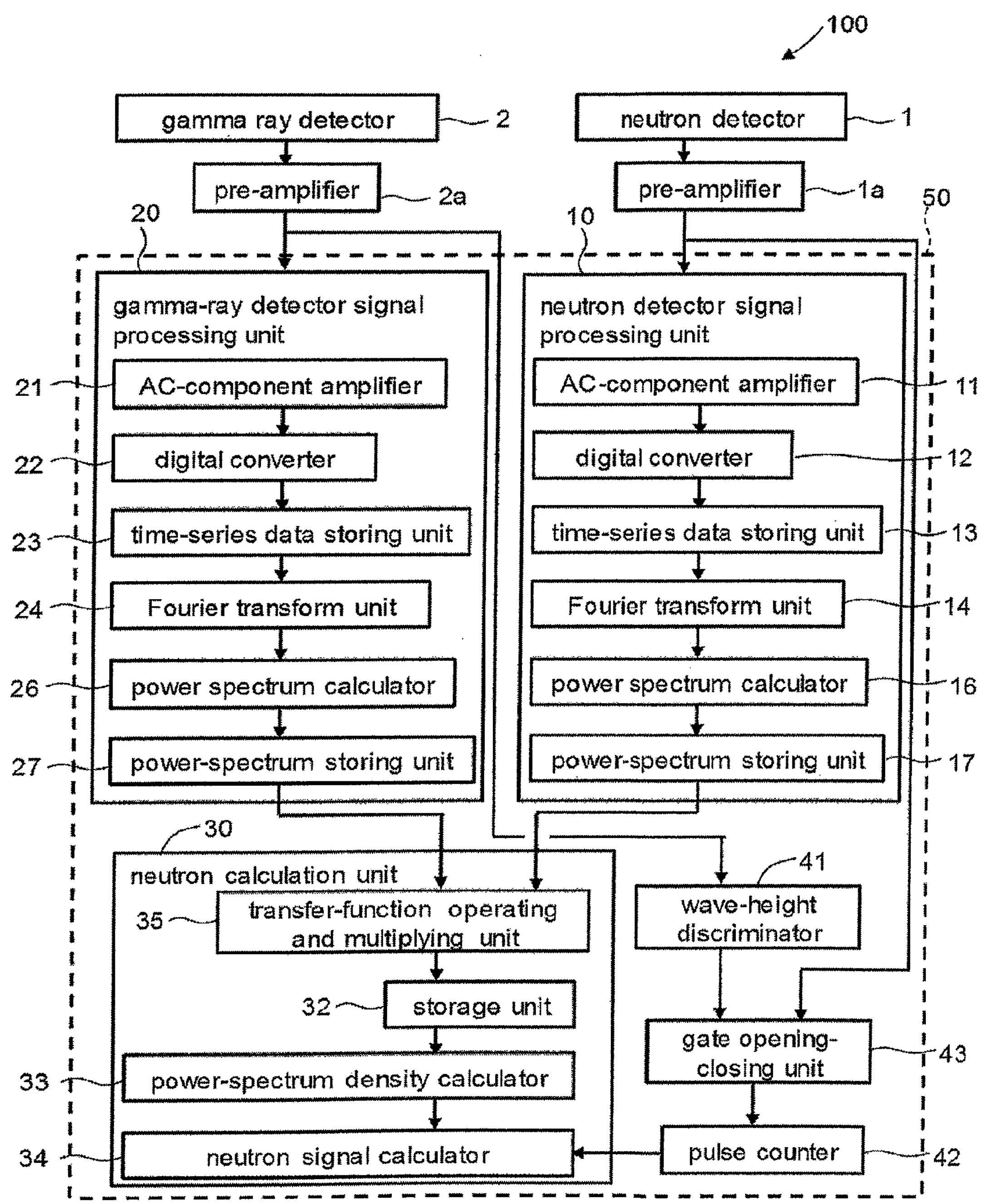
FIG. 24 is a block diagram showing a modified power spectrum calculator of the modified neutron measurement apparatus according to the sixth embodiment.

FIG. 24 is a block diagram showing a modified power spectrum calculator of the modified neutron measurement apparatus according to the sixth embodiment. In this respect, this apparatus is similar to the apparatus of FIG. 22 in configuration.

Other Embodiments

Some embodiments of this invention have been described. Nonetheless, they are no more than examples, not intended to limit the scope of the present invention.

The embodiments described above may be combined in any possible way. For example, the modified power spectrum operation units used in the first, second and fourth embodiments may be used in the third, fifth and sixth embodiments, respectively, as needed.

Further, the embodiments described above may be reduced to practice in various configurations. Various omissions, replacements and changes can be made, without departing from the scope and gist of the invention.

The accompanying claims and their equivalents are intended to cover such forms or modifications as would fall within the scope and spirit of this invention.

What is claimed is:

1. A neutron measurement apparatus comprising:

a neutron detector configured to measure neutrons;

a gamma ray detector configured to measure gamma rays;

a neutron detector signal processing unit configured to receive signals from the neutron detector sequentially, to perform Fourier transform on the signals received for a prescribed period, to generate neutron detector signal frequency data in a frequency domain, thereby to calculate the neutron-detection signal power spectrum and to store the neutron detector signal power spectrum;

a gamma-ray detector signal processing unit configured to receive signals from the gamma ray detector sequentially, to perform Fourier transform on the signals received for a prescribed period, to generate gamma ray detector signal frequency data in a frequency domain, thereby to calculate gamma ray detector signal power spectrum and to store the gamma ray detector signal power spectrum; and a neutron calculation unit configured to generate a neutron signal by removing a part contributed by the gammaray-detector signal power spectrum from the neutron detector signal power spectrum.

2. The neutron measurement apparatus according to claim 1, wherein the neutron calculation unit has:

a subtracter configured to subtract the gamma-ray-detector signal power spectrum from the neutron detector signal power spectrum, thereby to generate subtraction data;

a power-spectrum density calculator configured to calculate power spectrum density in the frequency domain from the subtraction data; and a neutron signal calculator configured to multiply the power spectrum density by a conversion factor, thereby to generate a neutron signal.

3. The neutron measurement apparatus according to claim 1, wherein, the neutron detector signal processing unit includes:

a first AC-component amplifier configured to extract an AC component from the output signal of a pre-amplifier connected to an output side of the neutron detector and to amplify the AC component;

a first digital converter configured to convert the output signal of the first AC-component amplifier into a digital signal and to output first time-series data;

a first time-series data storing unit configured to store the first time-series digital signal;

a first Fourier transform unit configured to perform Fourier transform on the first time-series data stored in the first time-series data storing unit, thereby to generate neutron detector signal frequency data in the frequency domain;

a first power spectrum calculator configured to calculate a power spectrum from the frequency data generated by the first Fourier transform unit; and a first power-spectrum storing unit configured to store the power spectrum calculated by the first power spectrum calculator; and the gamma-ray detector signal processing unit includes:

a second AC-component amplifier configured to extract an AC component from a pre-amplifier connected to an output side of the gamma ray detector and to amplify the AC component;

a second digital converter configured to convert the output signal of the second AC-component amplifier into a digital signal and to output second time-series data;

a second time-series data storing unit configured to store the second time-series digital signal;

a second Fourier transform unit configured to perform Fourier transform on the second time-series data stored in the second time-series data storing unit, thereby to generate gamma-ray-detector signal frequency data in the frequency domain;

a second power spectrum calculator configured to calculate a power spectrum from the frequency data generated by the second Fourier transform unit; and a second power-spectrum storing unit configured to store the power spectrum calculated by the second power spectrum calculator.

4. The neutron measurement apparatus according to claim 1, wherein the gamma-ray detector signal processing unit includes a correction unit configured to correct the gamma-ray-detector signal power spectrum, matching the gamma-ray-detector signal power spectrum to the gamma-ray contributing part of the neutron detector signal power spectrum.

5. The neutron measurement apparatus according to claim 1, wherein the gamma-ray detector signal processing unit includes an adjusting unit configured to adjust a signal in stages before being performed Fourier transform in a time domain, thereby to match the gamma-ray-detector signal power spectrum with the gamma-ray contributing part of the neutron detector signal power spectrum.

6. The neutron measurement apparatus according to claim 1, wherein the neutron detector signal processing unit has a first band limiter configured to limit the frequency band of the neutron detector signal power spectrum; and the gamma-ray detector signal processing unit has a second band limiter configured to limit the same frequency band of the gamma-ray detector signal as the first band limiter.

7. A neutron calculation apparatus comprising:

a neutron detector signal processing unit configured to receive signals sequentially from a neutron detector for measuring neutrons, to perform Fourier transform on the signals received for a prescribed period, to generate neutron detector signal frequency data in a frequency domain, thereby to calculate a neutron-detection signal power spectrum and to store the neutron detector signal power spectrum;

a gamma-ray detector signal processing unit configured to receive signals from a gamma ray detector sequentially, to perform Fourier transform on the signals received for a prescribed period, thereby to provide frequency data about gamma-ray detector signals in a frequency region and generate and store a gamma-ray-detector signal power spectrum; and a neutron calculation unit configured to generate a neutron signal by removing a part contributed by the gamma-ray-detector signal power spectrum, from the neutron detector signal frequency data.

8. A neutron measurement method comprising:

a neutron detector signal processing step in which a neutron detector signal processing unit receives signals from a neutron detector sequentially, performs Fourier transform on the signals received for a prescribed period, generates neutron detector signal frequency data in a frequency domain, thereby calculates the neutron-detection signal power spectrum and stores the neutron detector signal power spectrum;

a gamma-ray detector signal processing step in which a gamma-ray detector signal processing unit receives signals from a gamma ray detector sequentially, performs Fourier transform on the signals received for a prescribed period, generates the gamma-ray-detector signal frequency data in the frequency domain, thereby calculates gamma-ray-detector signal power spectrum and stores the gamma-ray-detector signal power spectrum; and a neutron signal generating step in which a neutron calculation unit generates a neutron signal by removing a part contributed by the gamma-ray-detector signal power spectrum from the neutron detector signal power spectrum.

* * * * *